(12) United States Patent
Harada et al.

(10) Patent No.: US 12,497,498 B2
(45) Date of Patent: Dec. 16, 2025

(54) DISPERSION LIQUID, COMPOSITION, SEALING MEMBER, LIGHT-EMITTING DEVICE, ILLUMINATION TOOL, DISPLAY DEVICE, METHOD FOR PRODUCING DISPERSION SOLUTION, AND METHOD FOR MODIFYING SURFACES OF METAL OXIDE PARTICLES

(71) Applicant: SUMITOMO OSAKA CEMENT CO., LTD., Tokyo (JP)

(72) Inventors: Kenji Harada, Tokyo (JP); Tomomi Ito, Tokyo (JP); Ryo Takeda, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 349 days.

(21) Appl. No.: 18/029,098

(22) PCT Filed: Sep. 29, 2021

(86) PCT No.: PCT/JP2021/035834
§ 371 (c)(1),
(2) Date: Mar. 29, 2023

(87) PCT Pub. No.: WO2022/071385
PCT Pub. Date: Apr. 7, 2022

(65) Prior Publication Data
US 2023/0416500 A1 Dec. 28, 2023

(30) Foreign Application Priority Data
Sep. 30, 2020 (JP) .................. 2020-165846

(51) Int. Cl.
*C08K 9/06* (2006.01)
*C08K 3/22* (2006.01)
(Continued)

(52) U.S. Cl.
CPC ............... *C08K 9/06* (2013.01); *C08K 3/22* (2013.01); *C08L 83/04* (2013.01); *C09C 3/08* (2013.01);
(Continued)

(58) Field of Classification Search
None
See application file for complete search history.

(56) References Cited

U.S. PATENT DOCUMENTS

2017/0226418 A1 8/2017 Otsuka et al.
2018/0062049 A1* 3/2018 Otsuka ............... C08G 59/4246
(Continued)

FOREIGN PATENT DOCUMENTS

EP 4129921 2/2023
JP H09208508 8/1997
(Continued)

OTHER PUBLICATIONS

"International Search Report (Form PCT/ISA/210) of PCT/JP2021/035834," with English translation thereof, mailed on Dec. 7, 2021, pp. 1-5.

Primary Examiner — Colin W. Slifka
(74) Attorney, Agent, or Firm — JCIPRNET

(57) ABSTRACT

In a dispersion liquid according to the present invention, regarding metal oxide particles that are obtained by vacuum-drying a dispersion liquid containing metal oxide particles which have been surface-modified by a methyl group and a phenyl group in a predetermined ratio, in a case where a transmission spectrum in a wavenumber range of 800 $cm^{-1}$ or higher and 3,800 $cm^{-1}$ or lower is measured by FT-IR, and values of the transmission spectrum are standardized, IA/IB≤3.5 is satisfied (IA represents a spectrum value standardized at 3,500 $cm^{-1}$, and IB represents a spectrum value standardized at 1,100 $cm^{-1}$).

11 Claims, 2 Drawing Sheets

(51) Int. Cl.
 *C08L 83/04* (2006.01)
 *C09C 3/08* (2006.01)
 *H10H 20/854* (2025.01)

(52) U.S. Cl.
 CPC ... *H10H 20/854* (2025.01); *C08K 2003/2244* (2013.01)

(56) References Cited

U.S. PATENT DOCUMENTS

2018/0323124 A1 11/2018 Yamaguchi et al.
2022/0177709 A1 6/2022 Ito et al.

FOREIGN PATENT DOCUMENTS

| | | |
|---|---|---|
| JP | 2016175804 | 10/2016 |
| JP | 2018107472 | 7/2018 |
| JP | 2020002305 | 1/2020 |
| JP | 2020055737 | 4/2020 |
| WO | 2016142992 | 9/2016 |
| WO | 2016208640 | 12/2016 |
| WO | 2020067417 | 4/2020 |
| WO | 2020203462 | 10/2020 |
| WO | 2021193727 | 9/2021 |

\* cited by examiner

DISPERSION LIQUID, COMPOSITION, SEALING MEMBER, LIGHT-EMITTING DEVICE, ILLUMINATION TOOL, DISPLAY DEVICE, METHOD FOR PRODUCING DISPERSION SOLUTION, AND METHOD FOR MODIFYING SURFACES OF METAL OXIDE PARTICLES

CROSS-REFERENCE TO RELATED APPLICATION

This application is a 371 of international application of PCT application serial no. PCT/JP2021/035834, filed on Sep. 29, 2021, which claims the priority benefit of Japan application no. 2020-165846 filed on Sep. 30, 2020. The entirety of each of the above-mentioned patent applications is hereby incorporated by reference herein and made a part of this specification.

TECHNICAL FIELD

The present invention relates to a dispersion liquid containing metal oxide particles which have been surface-modified by a silane compound and a silicone compound, a composition, a sealing member, a light-emitting device, an illumination tool, a display device, a method for producing a dispersion liquid, and a method for modifying the surfaces of metal oxide particles.

Priority is claimed on Japanese Patent Application No. 2020-165846, filed in Japan on Sep. 30, 2020, the content of which is incorporated herein by reference.

BACKGROUND ART

As a light source having advantages such as a small size, a long service life, and low-voltage driving, light-emitting diodes (LED) are being broadly used. An LED chip in an LED package is generally sealed by a sealing material containing a resin in order to prevent the contact with a deterioration factor present in the external environment such as oxygen or moisture. Therefore, light emitted from the LED chip passes through the sealing material and is released outwards. Therefore, it becomes important to efficiently extract the light emitted from the LED chip to the outside of the LED package in order to increase the luminous flux emitted from the LED package.

As a sealing material for improving the extraction efficiency of light emitted from the LED chip, a composition for forming a light scattering complex containing metal oxide particles which have been surface-modified by a surface-modifying material having at least one functional group selected from an alkenyl group, a H—Si group, and an alkoxy group and a matrix resin composition is known (for example, refer to Patent Literature 1).

In this composition for forming a light scattering complex, a dispersion liquid containing metal oxide particles is mixed with a silicone resin in a state in which transparency is relatively maintained. As the metal oxide particles, particles having small dispersed-particle diameters and a high refractive index are used. This configuration suppresses deterioration of the light-transmitting property and improves the light-scattering property in a light scattering complex that is obtained by curing the composition for forming a light scattering complex.

CITATION LIST

Patent Literature

[Patent Literature No. 1] International Publication No. 2016/142992

SUMMARY OF INVENTION

Technical Problem

By the way, silicone resins that are used as a sealing material for LEDs generally contain methyl groups and phenyl groups, which are hydrocarbon groups, and the ratio of the functional groups is adjusted depending on the application. For example, in an illumination application, a silicone resin has a structure in which many phenyl groups with a high refractive index are included in order to increase the amount of light extracted from LED chips. On the other hand, in an in-vehicle application, a silicone resin has a structure in which many methyl groups with high heat resistance are included in order to suppress deterioration of the silicone sealing resin due to high-output LEDs.

Therefore, a design for modifying the surfaces of metal oxide particles was necessary for each kind of a silicone sealing resin or for each application.

In addition, in recent years, the demand for methyl-based silicone resins containing many methyl groups with high heat resistance has been increasing in order to extend the service lives of LEDs. Methyl-based silicone resins have a large content of a methyl group and a high degree of hydrophobicity compared with phenyl-based silicone resins and the like that have been generally used in the related art. Therefore, there was a problem in that, even in a case where metal oxide particles having a hydrophobilized surface like the invention described in Patent Literature 1 are mixed with a methyl-based silicone resin, the metal oxide particles agglomerate with each other, and a transparent composition cannot be obtained.

In order to solve the above-described problem, studies are underway regarding a method for obtaining metal oxide particles which have been surface-modified and can be dispersed in methyl-based silicone resins by directly dispersing metal oxide particles in a silane compound to primarily modify the metal oxide particle and then secondarily modifying a silicone compound. Hereinafter, "metal oxide particles which have been surface-modified" may be abbreviated as "surface-modified metal oxide particles".

However, the surface-modified metal oxide particles obtained by the above-described method could not be dispersed in phenyl-based silicone resins containing many phenyl groups.

Therefore, there has been a demand for surface-modified metal oxide particles that can be dispersed both in methyl-based silicone resins and in phenyl-based silicone resins.

The present invention has been made to solve the above-described problem, and an object of the present invention is to provide a dispersion liquid containing surface-modified metal oxide particles that can be dispersed both in methyl-based silicone resins and in phenyl-based silicone resins, a composition containing the dispersion liquid, a sealing member formed using the composition, a light-emitting device having the sealing member, an illumination tool and a display device each including the light-emitting device, a method for producing the dispersion liquid, and a method for modifying the surfaces of the metal oxide particles.

Solution to Problem

In order to solve the above-described problem, a first aspect of the present invention is a dispersion liquid containing metal oxide particles which have been surface-modified by at least one kind of silane compound and at least one kind of silicone compound and a solvent, the silane compound contains a methyl group, in which the silicone compound contains a hydrocarbon group having 2 or more carbon atoms, and the mole ratio of the methyl group to the hydrocarbon group (methyl group/hydrocarbon group) in the metal oxide particles is 0.01 or more and 10 or less, in a case where a transmission spectrum of the metal oxide particles that are obtained by drying the dispersion liquid by vacuum drying is measured in a wavenumber range of 800 cm$^{-1}$ or higher and 3,800 cm$^{-1}$ or lower with a Fourier transform infrared spectrophotometer, and values of the transmission spectrum are standardized such that a maximum value of the transmission spectrum in the range is 100 and a minimum value is the following expression (1) is satisfied.

$$IA/IB \leq 3.5 \quad (1)$$

(In the expression, "IA" represents a spectrum value standardized at 3,500 cm$^{-1}$, and "IB" represents a spectrum value standardized at 1,100 cm$^{-1}$.)

In the first aspect of the present invention, the hydrocarbon group having 2 or more carbon atoms may be an aromatic hydrocarbon group.

In order to solve the above-described problem, a second aspect of the present invention provides a composition containing the dispersion liquid and a silicone resin component.

In order to solve the above-described problem, a third aspect of the present invention provides a sealing member that is a cured product of the composition.

In order to solve the above-described problem, a fourth aspect of the present invention provides a light-emitting device including the sealing member and a light-emitting element sealed with the sealing member.

In order to solve the above-described problem, a fifth aspect of the present invention provides an illumination tool including the light-emitting device.

In order to solve the above-described problem, a sixth aspect of the present invention provides a display device including the light-emitting device.

In order to solve the above-described problem, a seventh aspect of the present invention provides a method for producing the dispersion liquid of the first aspect.

In order to solve the above-described problem, an eighth aspect of the present invention provides a method for modifying the surfaces of metal oxide particles.

Advantageous Effects of Invention

According to the present invention, it is possible to provide a dispersion liquid containing surface-modified metal oxide particles that can be dispersed both in methyl-based silicone resins and in phenyl-based silicone resins, a composition containing the dispersion liquid, a sealing member formed using the composition, a light-emitting device having the sealing member, an illumination tool and a display device each including the light-emitting device, a method for producing a dispersion liquid, and a method for modifying the surfaces of metal oxide particles.

DESCRIPTION OF EMBODIMENTS

Figure 1:
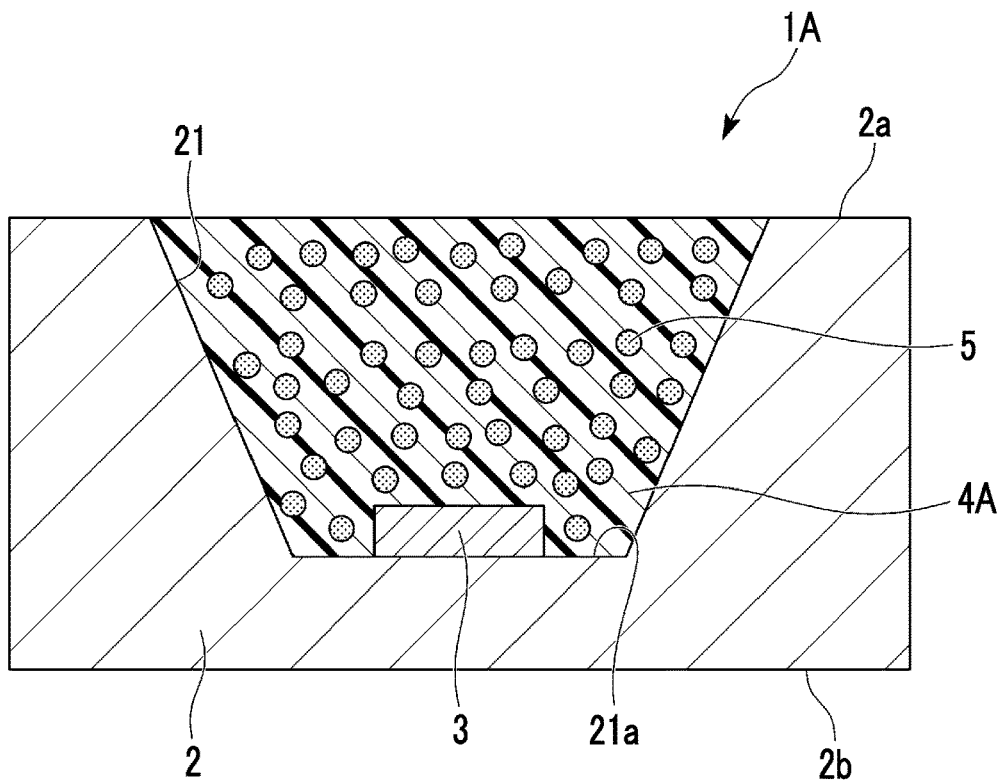
FIG. 1 is a schematic pattern diagram showing a preferable example of a light-emitting device according to an embodiment of the present invention.

Examples of a preferable embodiment of a dispersion liquid of the present invention, a composition containing the dispersion liquid, a sealing member formed using the composition, a light-emitting device having the sealing member, an illumination tool and a display device each having the light-emitting device, a method for producing a dispersion liquid, and a method for modifying the surfaces of metal oxide particles will be described.

The present embodiment is simply a specific description for better understanding of the gist of the invention and does not limit the present invention unless particularly otherwise specified. For example, conditions such as materials, amounts, kinds, numbers, sizes, ratios, orders, times, and temperatures and the like may be changed, added, or omitted as necessary unless particularly limited.

1. Present Inventors and the Like's Idea

First, prior to the detailed description of the present invention, an idea by the present inventors and the like that leads to the present invention will be described.

Generally, in the production of a sealing material (composition) that serves as a raw material of sealing members, metal oxide particles are modified by a surface-modifying material and dispersed in a resin such as a silicone resin. However, methyl-based silicone resins have a large content of a methyl group and a high degree of hydrophobicity compared with phenyl-based silicone resins and the like that have been generally used in the related art. Therefore, even in the case of using metal oxide particles modified by a surface-modifying material as described above, it was difficult to uniformly disperse the metal oxide particles in methyl-based silicone resins.

Therefore, the present inventors and the like carried out intensive studies to solve the problem. As a result, it was found that a simple increase in the amount of the surface-modifying material used does not significantly improve the dispersibility of metal oxide particles in methyl-based silicone resins.

The present inventors and the like accepted this result, carried out additional studies, and paid attention to the modification state of the surface-modifying material on the surfaces of the metal oxide particles. The studies were carried out based on the following ideas. That is, even when metal oxide particles are modified using a large amount of a surface-modifying material, in a case where only a small amount of the surface-modifying material is attached to the surfaces of the metal oxide particles, the surfaces of the metal oxide particle are not sufficiently hydrophobilized. On the other hand, even when metal oxide particles are modified using a small amount of a surface-modifying material, in a case where the proportion of the surface-modifying material attached to the surfaces of the metal oxide particles is high, and a large amount of the surface-modifying material is attached to the surfaces of the metal oxide particles, the surfaces of the metal oxide particles are sufficiently hydrophobilized.

In addition, the present inventors and the like found that, when a silane compound or a silicone compound is used as the surface-modifying material, the degree of attachment of the surface-modifying material to metal oxide particles as described above can be measured and observed with a Fourier transform infrared spectrophotometer (FT-IR). In addition, it was found that, when metal oxide particles are surface-modified by a silane compound and a silicone compound by a method to be described below, it is possible to disperse the metal oxide particles in methyl-based silicone resins, in which it was difficult to disperse metal oxide particles in the related art. Furthermore, it was found that, when metal oxide particles are surface-modified by a silane compound containing a methyl group and a silicone compound containing a hydrocarbon group having 2 or more carbon atoms in a mole ratio of the methyl groups to the hydrocarbon groups becoming 0.01 or higher and 10 or lower, it is possible to obtain surface-modified metal oxide particles that can be dispersed both in methyl-based silicone resins and in phenyl-based silicone resins.

2. Dispersion Liquid

A dispersion liquid according to the present embodiment will be described.

The dispersion liquid according to the present embodiment contains metal oxide particles which have been surface-modified by at least one kind of silane compound and at least one kind of silicone compound and a solvent, the silane compound contains a methyl group, the silicone compound contains a hydrocarbon group having 2 or more carbon atoms, and the ratio of the methyl group to the hydrocarbon group (methyl group/hydrocarbon group) in the metal oxide particles is 0.01 or more and 10 or less.

In addition, in the present embodiment, in a case where a transmission spectrum of the metal oxide particles that are obtained by drying the dispersion liquid by vacuum drying is measured in a wavenumber range of 800 cm$^{-1}$ or higher and 3,800 cm$^{-1}$ or lower with a Fourier transform infrared spectrophotometer, and measured values of the transmission spectrum are standardized such that the maximum value of the transmission spectrum in the range is 100 and a minimum value is 0, the following expression (1) is satisfied.

$$IA/IB \leq 3.5 \tag{1}$$

(In the expression, "IA" represents a spectrum value standardized at 3,500 cm$^{-1}$, and "IB" represents a spectrum value standardized at 1,100 cm$^{-1}$.)

When the above conditions are satisfied, the dispersion liquid according to the present embodiment can be dispersed both in methyl-based silicone resins and in phenyl-based silicone resins.

In more detail, in a transmission spectrum that is measured with a Fourier transform infrared spectrophotometer, the position at a wavenumber of 1,100 cm$^{-1}$ belongs to a siloxane bond (Si—O—Si bond), and the position at a wavenumber of 3,500 cm$^{-1}$ belongs to a silanol group (Si—OH group). The silane compound and the silicone compound each include a Si—OH group capable of forming a Si—O—Si bond and a group capable of forming a Si—OH group. Therefore, comparison of the spectrum value (IA) at 3,500 cm$^{-1}$ and the spectrum value (IB) at 1,100 cm$^{-1}$ makes it possible to observe the reaction degree of Si—OH group or a group capable of forming a Si—OH group in the silane compound and the silicone compound.

In addition, the present inventors and the like found that, in a case where the IA/IB is 3.5 or less, the silane compound is sufficiently attached to the surfaces of the metal oxide particles. Due to such a characteristic, the metal oxide particles do not agglomerate and can be dispersed in a methyl-based silicone resin when mixed with the methyl-based silicone resin.

In contrast, in a case where the IA/IB exceeds 3.5, the silane compound and the silicone compound are not sufficiently attached to the surfaces of the metal oxide particles, and it is not possible to make metal oxide particles having excellent dispersibility in methyl-based silicone resins. As a result, when the dispersion liquid and a methyl-based silicone resin are mixed together, there is a tendency that the metal oxide particles agglomerate and turbidity occurs in a composition to be obtained. The IA/IB is 3.5 or less as described above, but is preferably 3.0 or less, more preferably 2.5 or less, and still more preferably 2.0 or less.

In addition, the lower limit value of the IA/IB is 0 because IA is preferably 0. However, even when remaining in a small quantity, the silanol group (Si—OH group) can be mixed with the methyl-based silicone resin, and thus the lower limit value of the IA/IB may be 0, may be 0.1, may be 0.2, may be 0.5, may be 0.8, may be 1.0, and may be 1.5.

Specifically, the transmission spectrum of the metal oxide particles can be measured with a Fourier transform infrared spectrophotometer (FT-IR) as described below.

The dispersion liquid of the present embodiment is dried by vacuum drying. The drying conditions may be adjusted as appropriate depending on the amount and concentration of the dispersion liquid. For example, when the weight of the dispersion liquid having a solid content of 30% by mass is 10 g, the dispersion liquid may be dried at 100° C. and 20 hPa or less for 2 hours or longer. As a vacuum dryer, for example, VACUUM OVEN VOS-201SD manufactured by EYELA TOKYO RIKAKIKAI Co., Ltd. can be used.

Next, 0.01 g to 0.05 g of the metal oxide particles obtained by drying are used, whereby the transmission spectrum can be measured with a Fourier transform infrared spectrophotometer (for example, manufactured by JASCO Corporation, Model No.: FT/IR-670 Plus).

However, while being surface-modified metal oxide particles with an IA/IB of 3.5 or less, conventional surface-modified metal oxide particles were difficult to disperse in phenyl-based silicone resins.

Therefore, the present inventors carried out additional studies and found that, when metal oxide particles are surface-modified such that the mole ratio of the methyl groups to the hydrocarbon groups becomes 0.01 or more and 10 or less, it is possible to obtain surface-modified metal oxide particles that can be dispersed both in methyl-based silicone resins and in phenyl-based silicone resins.

In order to disperse the metal oxide particles in methyl-based silicone resins, surface modification of the metal oxide particles in a silane compound containing a methyl group becomes essential. However, metal oxide particles which have been surface-modified by such a method have a poor affinity to phenyl groups contained in silicone resins for LEDs. Silicone compounds have a higher affinity to silicone resins than to silane compounds. Therefore, it is presumed that, when a surface treatment is carried out using a silicone compound containing a hydrocarbon group having 2 or more carbon atoms, which has a higher affinity to phenyl groups than to methyl groups, it is possible to obtain highly versatile surface-modified metal oxide particles that can be dispersed both in methyl-based silicone resins and in phenyl-based silicone resins.

The present inventors and the like considered that surface-modified metal oxide particles that can be dispersed in methyl-based silicone resins have a high affinity to methyl groups and are thus difficult to disperse in phenyl-based silicone resins. Therefore, the result that highly versatile surface-modified metal oxide particles that can be dispersed both in methyl-based silicone resins and in phenyl-based silicone resins can be obtained by adjusting the mole ratio between the methyl groups and the hydrocarbon groups having 2 or more carbon atoms was unexpected.

In the present embodiment, the mole ratio (methyl group/hydrocarbon group) of the methyl group to the hydrocarbon group in the metal oxide particles is 0.01 or more and 10 or less, preferably 0.03 or more and 8 or less, more preferably 0.05 or more and 5 or less, and still more preferably 0.1 or more and 3 or less. The mole ratio may be 0.2 to 0.8, 0.8 to 2, 2 to 6, 6 to 9, or the like as necessary.

When the mole ratio is 0.01 or more and 10 or less, it becomes possible to transparently disperse the metal oxide particles both in methyl-based silicone resins and in phenyl-based silicone resins. In a case where the mole ratio of methyl group/hydrocarbon group is less than 0.01, the amount of the methyl group is too small, which makes it impossible to disperse the metal oxide particles in methyl-based silicone resins. On the other hand, when the mole ratio of methyl group/hydrocarbon group exceeds 10, it is not possible to disperse the metal oxide particles in phenyl-based silicone resins.

The mole ratio of the methyl groups to the hydrocarbon groups having 2 or more carbon atoms in the metal oxide particles means a ratio measured by NMR (nuclear magnetic resonance spectroscopy) by the following method. That is, the mole ratio means the mole ratio of the methyl group to the hydrocarbon group having 2 or more carbon atoms contained in the metal oxide particles which have been surface-modified. Therefore, the mole ratio substantially means the mole ratio of the methyl group to the hydrocarbon group having 2 or more carbon atoms contained in the silane compound and the silicone compound.

15 g of the dispersion liquid having a solid content adjusted to 30% by mass and 15 g of methanol are mixed to precipitate the surface-modified metal oxide particles. This liquid mixture is separated into solid and liquid with a centrifuge to recover a solid portion (surface-modified metal oxide particles). Several milligrams of the recovered surface-modified metal oxide particles are collected and dissolved in heavy chloroform so as to become 1% by mass. The $^1$H-liquid NMR spectrum of the hydrocarbon group having 2 or more carbon atoms and the methyl group is measured using this solution and an NMR device, for example, a tabletop NMR device (manufactured by Nanalysis Scientific Corp., Model No. NMReady60Pro ($^1$H/$^{19}$F)). The spectral areas (integral values) of the hydrocarbon group having 2 or more carbon atoms and the methyl group are calculated from the obtained spectrum, and the integral value of the methyl group/the integral value of the hydrocarbon group having 2 or more carbon atoms is calculated. Thereby, the mole ratio of the methyl groups to the hydrocarbon groups having 2 or more carbon atoms can be calculated.

The solid content of the dispersion liquid does not need to be 30% by mass, and the dispersion liquid may be collected in a quantity necessary to enable measurement by NMR.

(2.1 Metal Oxide Particles)

The metal oxide particles scatter light that is emitted from light-emitting elements in a sealing member to be described below. In addition, depending on the kind, the metal oxide particles improve the refractive index of the sealing member. This makes the metal oxide particles contribute to improvement in the brightness of light in light-emitting devices.

The metal oxide particles are not particularly limited. In the present embodiment, as the metal oxide particles, for example, metal oxide particles containing at least one kind selected from the group consisting of zirconium oxide particles, titanium oxide particles, zinc oxide particles, iron oxide particles, copper oxide particles, tin oxide particles, cerium oxide particles, tantalum oxide particles, niobium oxide particles, tungsten oxide particles, europium oxide particles, yttrium oxide particles, molybdenum oxide particles, indium oxide particles, antimony oxide particles, germanium oxide particles, zinc oxide particles, bismuth oxide particles, and hafnium oxide particles and potassium titanate particles, barium titanate particles, strontium titanate particles, potassium niobate particles, lithium niobate particles, calcium tungstate particles, yttria-stabilized zirconia particles, alumina-stabilized zirconia particles, calcia-stabilized zirconia particles, magnesia-stabilized zirconia particles, scandia-stabilized zirconia particles, hafnia-stabilized zirconia particles, ytterbia-stabilized zirconia particles, ceria-stabilized zirconia particles, *india*-stabilized zirconia particles, strontium-stabilized zirconia particles, samarium oxide-stabilized zirconia particles, gadolinium oxide-stabilized zirconia particles, antimony-added tin oxide particles, and indium-added tin oxide particles are preferably used.

Among the above-described metal oxide particles, the metal oxide particles are preferably at least one kind selected from the group consisting of zirconium oxide particles and titanium oxide particles from the viewpoint of improving transparency or compatibility (affinity) with a sealing resin (resin component).

In addition, the metal oxide particles preferably have a refractive index of 1.7 or higher from the viewpoint of improving the refractive index of the sealing member. The upper limit of the refractive index can be randomly selected and may be, for example, 3.0 or less or 2.5 or less, but is not limited only thereto.

The metal oxide particles are more preferably at least one of zirconium oxide particles and titanium oxide particles and particularly preferably zirconium oxide particles.

The average primary particle diameter of the metal oxide particles is preferably 1 nm or more and 200 nm or less, more preferably 3 nm or more and 150 nm or less, and still more preferably 10 nm or more and 100 nm or less. The average primary particle diameter may be 5 to 30 nm, 30 to 50 nm, 50 to 80 nm, 80 to 130 nm, or the like as necessary. When the average primary particle diameter of the metal oxide particles is within the above-described range, it is possible to suppress the deterioration of the transparency of the sealing member. As a result, it is possible to further improve the brightness of light of light-emitting devices.

The average primary particle diameter of the metal oxide particles can be measured by, for example, observation with a transmission electron microscope. First, inorganic oxide particles are observed with a transmission electron microscope to obtain a transmission electron microscopic image. Next, a predetermined number, for example, 100, of the inorganic oxide particles in the transmission electron microscopic image are selected. In addition, the longest straight-line segments (longest diameters) of the individual inorganic oxide particles are measured, and these measurement values are arithmetically averaged, thereby obtaining the average primary particle diameter.

Here, in a case where the metal oxide particles agglomerate together, the measurement subject is not the agglomerated particle diameter of this agglomerate. The longest diameters of a predetermined number of particles (primary particles) of the metal oxide particles that configure this agglomerate are measured, and the average primary particle diameter is obtained.

The average dispersed-particle diameter of the metal oxide particles in the dispersion liquid of the present embodiment is not particularly limited, but is, for example, 10 nm or more and 300 nm or less, preferably 20 nm or more and 250 nm or less, and more preferably 30 nm or more and 200 nm or less. The average dispersed-particle diameter may be 50 nm or more and 180 nm or less or 100 nm or more and 150 nm or less as necessary. When the average dispersed-particle diameter of the metal oxide particles is 10 nm or more, the brightness of light of a light-emitting device to be described below that is produced using this dispersion liquid improves. In addition, when the average dispersed-particle diameter of the metal oxide particles is 300 nm or less, it is possible to suppress a decrease in the light transmittance of the dispersion liquid or a composition to be described below and the sealing member that are produced using the dispersion liquid. As a result, the brightness of light of the light-emitting device improves.

The average dispersed-particle diameter of the metal oxide particles can be the particle diameter D50 of the metal oxide particles when the cumulative percentage of a scattering intensity distribution obtained by the dynamic light scattering method is 50% and can be measured with a dynamic light scattering type particle size distribution meter (for example, manufactured by HORIBA, Ltd., Model No.: SZ-100SP). The measurement can be carried out on the dispersion liquid having a solid content adjusted to 5% by mass as a subject using a silica cell having a 10 mm×10 mm optical path length. In the present specification, "solid content" refers to a residue when a volatile component has been removed from the dispersion liquid. For example, in a case where 1.2 g of the dispersion liquid is put into a magnetic crucible and heated at 150° C. for 1 hour on a hot plate, a component that does not volatilize but remains (the metal oxide particles, the surface-modifying material, or the like) can be regarded as the solid content.

In addition, the average dispersed-particle diameter of the metal oxide particles is measured and calculated based on the diameters of the metal oxide particles in a dispersed state regardless of whether the metal oxide particles are dispersed in a primary particle or secondary particle state. In addition, in the present embodiment, the average dispersed-particle diameter of the metal oxide particles may be measured as the average dispersed-particle diameter of the metal oxide particles to which the surface-modifying material has been attached. In the dispersion liquid, the metal oxide particles to which the surface-modifying material has been attached and the metal oxide particles to which the surface-modifying material is not attached can be present. Therefore, usually, the average dispersed-particle diameter of the metal oxide particles is measured as a value in a mixed state thereof.

To the surfaces of the metal oxide particles described above, a surface-modifying material to be described below is attached. Therefore, the metal oxide particles are stably dispersed in the dispersion liquid and a composition that are produced using the metal oxide particles.

(2.2 Silane Compound)

The surface-modified metal oxide particles according to this embodiment are metal oxide particles which have been surface-modified by a silane compound containing a methyl group. The silane compound containing a methyl group may means a silane compound containing a methyl group, but not containing a hydrocarbon group having 2 or more carbon atoms.

As the silane compound in the present embodiment, a silane compound containing a hydrocarbon group having 2 or more carbon atoms may be jointly used with the silane compound containing a methyl group as long as the methyl group/hydrocarbon group of the metal oxide particles is within a predetermined range. In addition, a silane compound containing a functional group other than a methyl group or a hydrocarbon group having 2 or more carbon atoms may also be jointly used. The number (kinds) of the silane compounds that are used in the present embodiment is not particularly limited and may be, for example, 1 to 10 kinds, 2 to 8 kinds, 3 to 6 kinds, 4 to 5 kinds or the like.

From the viewpoint of attaching a larger amount of the silane compound to the metal oxide particles, in the present embodiment, it becomes essential to modify the surfaces of the metal oxide particles with a silane compound containing a methyl group. However, once the silane compound containing a methyl group is sufficiently attached to the surfaces of the metal oxide particles, subsequent surface modification is not particularly limited as long as the compatibility with the silicone resin is not impaired or the compatibility is enhanced. Silicone resins for LEDs generally contain a methyl group and a phenyl group, which are hydrocarbon groups, as functional groups. Therefore, as the silane compound of the present embodiment, primary modification and secondary modification may be carried out by a silane compound containing a methyl group or primary modification may be carried out by a silane compound containing a methyl group and then secondary modification may be carried out by a silane compound containing a hydrocarbon group having 2 or more carbon atoms. From the viewpoint of improving the compatibility with phenyl groups in silicone resins for LEDs and improving the stability of the dispersion liquid, the surfaces of the metal oxide particles are preferably surface-modified by a silane compound containing a methyl group and a silane compound containing a hydrocarbon group having 2 or more carbon atoms. Therefore, at least one silane compound that is used in the present embodiment preferably contain a methyl group and a hydrocarbon group having 2 or more carbon atoms.

At least a part of these silane compounds is attached to the surfaces of the metal oxide particles to modify the surfaces, thereby preventing the agglomeration of the metal oxide particles. Furthermore, the silane compounds improve the compatibility with silicone resin components for LEDs, in other words, silicone resin components containing a methyl group and a phenyl group.

Here, the silane compound "being attached to" the metal oxide particles refers to the fact that the silane compound comes into contact with or bonds to the metal oxide particles by an interaction or reaction therebetween. As the contact, for example, physical adsorption is exemplified. In addition, as the bond, an ionic bond, a hydrogen bond, a covalent bond, and the like are exemplified.

The silane compound containing a methyl group is not particularly limited as long as the silane compound can be attached to the surfaces of the metal oxide particles. As the silane compound containing a methyl group, a silane compound containing a methyl group and an alkoxy group, a silane compound containing a methyl group and an H—Si group, or a silane compound containing a methyl group, an alkoxy group, and an H—Si group can be used.

One silane compound containing a methyl group may be used singly or two or more silane compounds may be used in combination. The silane compound containing a methyl group is preferably a silane compound containing an alkoxy group, particularly, a methoxy group, since it is easy to attach the silane compound to the metal oxide particles.

As the silane compound containing a methyl group and an alkoxy group, it is possible to use, for example, at least one selected from the group consisting of methyltrimethoxysilane, methyltriethoxysilane, methyltripropoxysilane, methylphenyldimethoxysilane, methylphenyldiethoxysilane, trimethylmethoxysilane, trimethylethoxysilane, methoxydimethyl(phenyl)silane, ethoxydimethyl(phenyl)silane, dimethyl(methoxy)phenylsilane, and dimethyl(ethoxy)phenylsilane.

As the silane compound containing a methyl group and an H—Si group, it is possible to use at least one selected from the group consisting of dimethylchlorosilane, methyldichlorosilane, and methylphenylchlorosilane.

As the silane compound containing a methyl group, an alkoxy group and an H—Si group, it is possible to use, for example, diethoxymethylsilane or ethoxydimethylsilane.

Among them, the silane compound containing a methyl group preferably contains a silane compound including methyl groups and alkoxy groups from the viewpoint of a low viscosity and easy dispersion of the metal oxide particles in a dispersion step to be described below.

The number of the alkoxy groups in such a silane compound containing methyl groups and alkoxy groups is preferably 1 or more and 3 or less, and the number of the alkoxy groups is more preferably 3. The number of carbon atoms in the alkoxy group is preferably 1 or more and 5 or less and more preferably 2 or more and 4 or less.

The number of the methyl groups in the silane compound containing methyl groups and alkoxy groups is preferably 1 or more and 3 or less and more preferably 1.

The total number of the alkoxy groups and the methyl groups in the silane compound containing methyl groups and alkoxy groups is 2 or more and 4 or less and preferably 4.

Such a silane compound containing methyl groups contains, for example, at least one selected from the group consisting of methyltrimethoxysilane, methyltriethoxysilane, and methyltripropoxysilane. Methyltrimethoxysilane is preferable, methyltriethoxysilane is preferable, and methyltrimethoxysilane is more preferably used from the viewpoint of easy attachment to the surfaces of the metal oxide particles.

The hydrocarbon group having 2 or more carbon atoms that is contained in the silane compound is not particularly limited as long as the hydrocarbon group is easily compatible with silicone resins for LEDs. For example, the hydrocarbon group may be an aliphatic hydrocarbon group having 2 or more carbon atoms or may be an aromatic hydrocarbon group.

The number of carbon atoms in the hydrocarbon group may be selected as appropriate depending on the kind of a functional group that is contained in silicone resins for LEDs. In consideration of the fact that silicone resins for LEDs usually contain a methyl group and a phenyl group, the number of carbon atoms is preferably 2 or more and 20 or less, more preferably 3 or more and 16 or less, still more preferably 4 or more and 12 or less, and far still more preferably 5 or more and 9 or less.

As the aliphatic hydrocarbon group, an alkyl group, an alkenyl group, and an alkynyl group can be used. The aliphatic hydrocarbon group may be a chain aliphatic hydrocarbon group or may be a cyclic aliphatic hydrocarbon group. As the alkyl group, it is possible to use, for example, an ethyl group, a propyl group, a butyl group, a pentyl group, a hexyl group and the like. As the alkenyl groups, it is possible to use, for example, a vinyl group, an allyl group, a propenyl group, a butenyl group and the like. As the alkynyl group, it is possible to use an ethynyl group, a propynyl group, a butynyl group, and the like.

As the aromatic hydrocarbon group, an aryl group or an aralkyl group can be used.

As the aryl group, it is possible to use, for example, a phenyl group, a tolyl group, a xylyl group, a biphenyl group, a 1-naphthyl group, 2-naphthyl, a phenanthryl group, and the like.

As the aralkyl group, it is possible to use, for example, a trityl group, a benzyl group, a phenylethyl group, a phenylpropyl group, a styryl group, a benzylidene group, and the like.

Among them, the hydrocarbon group having 2 or more carbon atoms is preferably a phenyl group or a xylyl group and more preferably a phenyl group from the viewpoint of excellent compatibility with silicone resins for LEDs.

As the silane compound containing a hydrocarbon group having 2 or more carbon atoms, it is possible to use, for example, at least one selected from the group consisting of phenyltrimethoxysilane, phenyltriethoxysilane, methylphenylchlorosilane, diphenylchlorosilane, phenyldichlorosilane, methylphenyldimethoxysilane, diphenylmonomethoxysilane, methylphenyldiethoxysilane, and diphenylmonoethoxysilane. Among these, phenyltrimethoxysilane is preferably used from the viewpoint of easy adjustment for improving the compatibility with silicone resins for LEDs.

The content of the silane compound in the dispersion liquid is not particularly limited, but is, for example, preferably 50% by mass or more and 700% by mass or less, more preferably 70% by mass or more and 600% by mass or less, and still more preferably 90% by mass or more and 500% by mass or less with respect to the amount of the metal oxide particles. The total content of the silane compound and the silicone compound may be 120% to 400% by mass, 150% to 300% by mass, or the like as necessary. In such a case, it is possible to densely attach the silane compound to the surfaces of the metal oxide particles, the dispersion stability of the metal oxide particles is improved, and it is possible to improve the dispersibility into methyl-based silicone resins and phenyl-based silicone resins.

(2.3 Silicone Compound)

The silicone compound containing a hydrocarbon group having 2 or more carbon atoms has a relatively large molecular weight and contributes to improvement in the affinity a silicone resin component to be described below. The silicone compound is present near the surfaces of the metal oxide particles which have been surface-modified by the silane compound. The silicone compound also serves as an intermediary between the metal oxide particles which have been surface-modified by the silane compound and the silicone resin component to be described below. Therefore, the silicone compound is not particularly limited as long as the silicone compound contains a hydrocarbon group having 2 or more carbon atoms and is compatible with the metal oxide particles which have been surface-modified by the silane compound and the silicone resin component. The silicone compound may or may not contain a methyl group. The number (kinds) of the silicone compounds that are used in the present embodiment is not particularly limited and may be, for example, 1 to 10 kinds, 2 to 8 kinds, 3 to 6 kinds, 4 to 5 kinds or the like.

Since the silicone compound only needs to be present between the metal oxide particles which have been surface-modified by the silane compound and the silicone resin component, the silicone compound needs to be present near the surfaces of the metal oxide particles which have been surface-modified by the silane compound and may or may not be attached to the metal oxide particles which have been surface-modified by the silane compound.

That is, "being surface-modified by the silane compound and the silicone compound" in the present embodiment means that the silane compound is attached to the metal oxide particles and the silicone compound is present near the surfaces of the metal oxide particles to which the silane compound is attached.

Since silicone resins for LEDs contain a methyl group and a phenyl group, the silicone compound of the present embodiment may contain a methyl group in addition to the hydrocarbon group having 2 or more carbon atoms. Regarding the hydrocarbon group having 2 or more carbon atoms, the same hydrocarbon group as described in the section of the silane compound can be used.

In addition, the silicone compound of the present embodiment may be jointly used with a silicone compound not containing a hydrocarbon group having 2 or more carbon atoms but containing a methyl group.

Examples of the silicone compound containing a hydrocarbon group having 2 or more carbon atoms include alkoxy group-containing phenyl silicone, methyl phenyl silicone, methyl phenyl hydrogen silicone, diphenyl hydrogen silicone, alkoxy both-terminal phenyl silicone, alkoxy both-terminal methyl phenyl silicone, alkoxy group-containing methyl phenyl silicone, alkoxy group-containing phenyl silicone, and the like.

These silicone compounds may be used singly or two or more silicone compounds may be used in combination.

Examples of the silicone compound not containing a hydrocarbon group having 2 or more carbon atoms but containing a methyl group include dimethyl silicone, methyl hydrogen silicone, alkoxy group-containing dimethyl silicone, alkoxy one-terminal trimethyl one-terminal (methyl group one-terminal) dimethyl silicone, and the like. These silicone compounds may be used singly or two or more silicone compounds may be used in combination.

The silicone compound may be a monomer, may be an oligomer, or may be a resin (polymer). A monomer or an oligomer is preferably used since surface modification is easy.

Among the above-described silicone compounds, from the viewpoint of easiness in reaction and high hydrophobicity, the silicone compound containing a hydrocarbon group having 2 or more carbon atoms is preferably at least one selected from the group consisting of alkoxy group-containing phenyl silicone, methyl phenyl silicone, alkoxy both-terminal phenyl silicone, alkoxy both-terminal methyl phenyl silicone, alkoxy group-containing methyl phenyl silicone, and alkoxy group-containing phenyl silicone and more preferably methoxy group-containing phenyl silicone.

In addition, from the viewpoint of easiness in reaction, the silicone compound not containing a hydrocarbon group having 2 or more carbon atoms, but containing a methyl group is preferably dimethyl silicone, alkoxy group-containing dimethyl silicone, alkoxy one-terminal trimethyl one-terminal (methyl group one-terminal) dimethyl silicone and more preferably at least one selected from the group of dimethyl silicone and methoxy group-containing dimethyl silicone.

The content of the silicone compound in the dispersion liquid is not particularly limited, but is, for example, preferably 10% by mass or more and 500% by mass or less, more preferably 15% by mass or more and 400% by mass or less, and still more preferably 100% by mass or more and 300% by mass or less with respect to the metal oxide particles. The content of the silicone compound may be 20% by mass or more and 250% by mass or less, 30% by mass or more and 200% by mass or less, or 50% by mass or more and 100% by mass or less as necessary. In such a case, it is possible to attach a sufficient amount of the silicone compound to the surfaces of the metal oxide particles, the dispersion stability of the metal oxide particles is improved, and it is possible to improve the dispersibility into methyl-based silicone resins. Furthermore, it is possible to reduce the amount of the isolated silicone compound and to suppress unintended agglomeration of the metal oxide particles in methyl-based silicone resins and phenyl-based silicone resins.

In addition, the dispersion liquid may contain a general surface-modifying material, dispersant or the like other than the silane compound and the silicone compound as surface-modifying material.

The total content of the silane compound and the silicone compound with respect to the amount of the metal oxide particles is not particularly limited, but is, for example, preferably 100% by mass or more and 1000% by mass or less, more preferably 150% by mass or more and 800% by mass or less, and still more preferably 190% by mass or more and 600% by mass or less. The total content of the silane compound and the silicone compound may be 250% to 500% by mass, 300% to 400% by mass, or the like as necessary. When the total amount of the silane compound and the silicone compound is within the above-described range, it is possible to sufficiently improve the dispersibility of the metal oxide particles while reducing the amount of the silane compound and silicone compound to be liberated.

(2.4 Solvent)

The dispersion liquid according to the present embodiment contains a solvent that disperses the metal oxide particles as a dispersion medium. This solvent is not particularly limited as long as the solvent is capable of dispersing the metal oxide particles to which the silane compound has been attached and the silicone compound and can be mixed with the silicone resin component to be described below, but is preferably a hydrophobic solvent.

Examples of such a hydrophobic solvent include aromatic solvents, saturated hydrocarbons, unsaturated hydrocarbons, and the like. These hydrophobic solvents may be used singly or two or more hydrophobic solvents may be used in combination.

Among the above-described hydrophobic solvents, aromatic solvents, particularly, aromatic hydrocarbons are preferable. The aromatic solvents have excellent compatibility with silicone resins for LEDs and thereby contribute to improvement in the viscosity characteristics of compositions to be obtained and improvement in the qualities (transparency, shape, and the like) of sealing members to be formed.

Examples of such aromatic hydrocarbons include benzene, toluene, ethylbenzene, 1-phenylpropane, isopropylbenzene, n-butylbenzene, tert-butylbenzene, sec-butylbenzene, o-xylene, m-xylene, p-xylene, 2-ethyltoluene, 3-ethyltoluene, 4-ethyltoluene, and the like. These aromatic hydrocarbons may be used singly or two or more aromatic hydrocarbons may be used in combination.

Among the above-described aromatic hydrocarbons, from the viewpoint of the stability of the dispersion liquid or easiness in handleability in the removal of the hydrophobic solvent or the like during the production of a composition to be described below, at least one selected from the group consisting of toluene, o-xylene, m-xylene, p-xylene, and benzene is preferably used, and toluene is more preferably used.

The content of the solvent contained in the dispersion liquid needs to be adjusted as appropriate so as to obtain a desired solid content. The content of the solvent is, for example, preferably 40% by mass or more and 95% by mass or less, more preferably 50% by mass or more and 90% by mass or less, and still more preferably 60% by mass or more and 80% by mass or less. In such a case, the mixing of the dispersion liquid and the resin component to be described below, particularly, silicone resins for LEDs, becomes easier.

The dispersion liquid of the present embodiment may contain a hydrophilic solvent. The hydrophilic solvent can be contained in the dispersion liquid due to, for example, a method to be described below. Examples of such a hydrophilic solvent include alcohol-based solvents, ketone-based solvents, nitrile-based solvents, and the like. These hydrophilic solvents may be used singly or two or more hydrophilic solvents may be used in combination.

Examples of the alcohol-based solvents include branched or linear alcohol compounds having 1 to 4 carbon atoms and ether condensates thereof. These alcohol-based solvents may be used singly or two or more alcohol-based solvents may be used in combination. In addition, an alcohol compound that is contained in the alcohol-based solvents may be any of a primary alcohol, a secondary alcohol, and a tertiary alcohol. In addition, the alcohol compound that is contained in the alcohol-based solvents may be any of a monohydric alcohol, a dihydric alcohol, and a trihydric alcohol. More specifically, examples of the alcohol-based solvents include methanol, ethanol, 1-propanol, isopropyl alcohol, 1-butyl alcohol, 2-butanol, isobutyl alcohol, tert-butyl alcohol, methanediol, 1,2-ethanediol, 1,2-propanediol, 1,3-propanediol, 1,2-butanediol, 1,3-butanediol, 1,4-butanediol, 2,3-butanediol, 2-butene-1,4-diol, 1,4-butynediol, glycerin, diethylene glycol, 3-methoxy-1,2-propanediol, and the like.

Examples of the ketone-based solvents include acetone, methyl ethyl ketone, methyl isobutyl ketone, cyclohexanone, and the like.

Examples of the nitrile-based solvents include acetonitrile and the like.

From the viewpoint of excellent affinity to both water and the hydrophobic solvent and acceleration of the mixing thereof, the hydrophilic solvent preferably contains the alcohol-based solvent. In this case, the number of carbon atoms in the alcohol compound that configures the alcohol-based solvent is preferably 1 or more and 3 or less and more preferably 1 or more and 2 or less.

Among the above-described alcohol compounds, methanol and ethanol, particularly, methanol, can be preferably used since it is possible to sufficiently develop the effect of the above-described alcohol-based solvents.

In addition, the content of the hydrophilic solvent in the dispersion liquid is, for example, preferably 10% by mass or less, more preferably 7% by mass or less, still more preferably 5% by mass or less, and particularly preferably 3% by mass or less. The content of the hydrophilic solvent may be 1% by mass or less, 0.5% by mass or less, or by mass. The content of the hydrophilic solvent may be 0% by mass.

(2.5 Other Components)

The dispersion liquid according to the present embodiment may contain components other than the components described above. For example, the dispersion liquid according to the present embodiment may contain, as necessary, components other than the components described above, for example, general additives such as a dispersant, a dispersion aid, an antioxidant, a flow adjuster, a viscosity improver, a pH adjuster, and a preservative.

In addition, the dispersion liquid according to the present embodiment may contain components that may be contained due to the method to be described below, for example, an acid, water, an alcohol, and the like.

In the present specification, the dispersion liquid according to the present embodiment is differentiated from a composition according to the present embodiment that contains a resin component and is capable of forming sealing members by curing. That is, the dispersion liquid according to the present embodiment does not contain a resin component, which will be described below, to an extent that the dispersion liquid is capable of forming sealing members simply by curing. More specifically, the mass ratio between the resin component and the metal oxide particles in the dispersion liquid according to the present embodiment is preferably within a range of 0:100 to 40:60 and more preferably within a range of 0:100 to 20:80 (resin component: inorganic oxide particles). The mass ratio may be within a range of 0:100 to 10:90, a range of 0:100 to 5:95, or a range of 0:100 to 2:98 as necessary. The dispersion liquid according to the present embodiment more preferably does not essentially contain the resin component to be described below and particularly preferably does not contain the resin component to be described below at all.

The dispersion liquid according to the present embodiment is a dispersion liquid that contains metal oxide particles which have been surface-modified by a predetermined silane compound and a solvent and satisfies the expression (1) and thus can be dispersed both in methyl-based silicone resins and in phenyl-based silicone resins. Therefore, in both a case where the dispersion liquid of the present embodiment is dispersed in methyl-based silicone resins and a case where the dispersion liquid is dispersed in phenyl-based silicone resins, the occurrence of turbidity such as white turbidity is suppressed. Furthermore, changes in the viscosities of silicone resins for LEDs containing the surface-modified metal oxide particles are also suppressed.

3. Method for Producing Dispersion Liquid

Next, a method for producing a dispersion liquid according to the present embodiment will be described.

The method for producing a dispersion liquid according to the present embodiment has a step B of obtaining a liquid mixture by mixing a first surface-modifying material and metal oxide particles, a step C of dispersing the metal oxide particles in the liquid mixture and a step F of obtaining a dispersion liquid by adding a second surface-modifying material to the liquid mixture. The content of the metal oxide particles in the liquid mixture is 10% by mass or more and 49% by mass or less, and a total content of the first surface-modifying material and the metal oxide particles in the liquid mixture is 65% by mass or more and 98% by mass or less. The first surface-modifying material is a silane compound containing a methyl group, and the second surface-modifying material contains a silicone compound containing a hydrocarbon group having 2 or more carbon atoms.

The content of the metal oxide particles in the liquid mixture may be 15% by mass or more and 45% by mass or less, 20% by mass or more and 40% by mass or less, 25% by mass or more and 35% by mass or less, or 30 mass % or more and 33 mass % or less as necessary. The total content of the first surface-modifying material and the metal oxide particles in the liquid mixture may be 68% by mass or more and 97% by mass or less, 69% by mass or more and 96% by mass or less, 70% by mass or more and 95% by mass or less, 75% by mass or more and 90% by mass or less, or 80% by mass or more and 85% by mass or less as necessary.

That is, the method for producing a dispersion liquid according to the present embodiment has a step B of obtaining a liquid mixture by mixing a silane compound containing a methyl group and metal oxide particles, a step C of obtaining a dispersion liquid (first dispersion liquid) by dispersing the metal oxide particles in the liquid mixture and a step F of obtaining a dispersion liquid (third dispersion liquid) by adding a silicone compound containing a hydrocarbon group having 2 or more carbon atoms to the dispersion liquid containing the metal oxide particles.

In addition, the method for producing a dispersion liquid according to the present embodiment is also a method for modifying the surfaces of metal oxide particles. Therefore, the method for producing a dispersion liquid can be rephrased as described below.

That is, a method for modifying the surfaces of metal oxide particles according to the present embodiment has a step B of obtaining a liquid mixture by mixing a first surface-modifying material and metal oxide particles, a step C of dispersing the metal oxide particles in the liquid mixture, and a step F of adding a second surface-modifying material to the liquid mixture. The content of the metal oxide particles in the liquid mixture is 10% by mass or more and 49% by mass or less, and a total content of the first surface-modifying material and the metal oxide particles in the liquid mixture is 65% by mass or more and 98% by mass or less. The first surface-modifying material is a silane compound containing a methyl group, and the second surface-modifying material contains a silicone compound containing a hydrocarbon group having 2 or more carbon atoms.

The total content of the silane compound containing a methyl group, the silicone compound containing a hydrocarbon group having 2 or more carbon atoms, and the metal oxide particles can also be evaluated from the solid content.

In addition, the total content of the silane compound containing a methyl group, the silicone compound containing a hydrocarbon group having 2 or more carbon atoms, and the metal oxide particles does not include an alcohol that is generated by the hydrolysis of the silane compound to be described below. That is, the total content of the silane compound containing a methyl group, the silicone compound containing a hydrocarbon group having 2 or more carbon atoms, and the metal oxide particles means the total content of the silane compound, the hydrolyzed silane compound, the silicone compound, and the metal oxide particles. It is needless to say that the total content is a value including the contents of the metal oxide particles which have been surface-modified by the silane compound containing a methyl group and the silicone compound containing a hydrocarbon group having 2 or more carbon atoms.

In addition, in the present embodiment, prior to the above-described step B, a step A (hydrolysis step) of mixing a silane compound containing a methyl group and water to obtain a hydrolyzed liquid containing a hydrolyzed silane compound containing a methyl group may be provided as necessary.

In addition, in a case where the metal oxide particles are also surface-modified by a silane compound containing a hydrocarbon group having 2 or more carbon atoms, for the silane compound containing a hydrocarbon group having 2 or more carbon atoms, similar to the silane compound containing a methyl group, the step A of obtaining a hydrolyzed liquid (hydrolysis step) may be provided.

Hereinafter, each step will be described in detail. A step of hydrolyzing a silane compound containing a methyl group will be described as a first hydrolysis step, and a step of hydrolyzing a silane compound containing a hydrocarbon group having 2 or more carbon atoms will be described as a second hydrolysis step.

(Step A (first Hydrolysis Step))

In the first hydrolysis step, a silane compound containing a methyl group (first silane compound) and water are mixed to obtain a hydrolyzed liquid containing a hydrolyzed silane compound containing a methyl group. The use of a liquid mixture in which at least a part of a silane compound containing a methyl group has been hydrolyzed in advance as described above makes it easy for the silane compound containing a methyl group to be attached to the metal oxide particles in the dispersion step C to be described below. The silane compound containing a methyl group does not contain a hydrocarbon group having 2 or more carbon atoms.

In addition, the content of the silane compound containing a methyl group in the hydrolyzed liquid is not particularly limited, such a silane compound can be regarded as a remainder with respect to other components in the hydrolyzed liquid, and the content thereof is, for example, preferably 60% by mass or more and 99% by mass or less, more preferably 70% by mass or more and 97% by mass or less, and still more preferably 80% by mass or more and 95% by mass or less.

In the first hydrolysis step, a surface-modifying material other than the silane compound containing a methyl group may be contained in the hydrolyzed liquid.

In addition, in the first hydrolysis step, the hydrolyzed liquid contains water. Water serves as a substrate for the hydrolysis reaction of the surface-modifying materials such as the silane compound containing a methyl group.

The content of water in the hydrolyzed liquid is not particularly limited and can be set as appropriate depending on, for example, the amount of the silane compound containing a methyl group. For example, the amount of water that is added to the hydrolyzed liquid is preferably 0.5 mol or more and 5 mol or less, more preferably 0.6 mol or more and 3 mol or less, and still more preferably 0.7 mol or more and 2 mol or less with respect to 1 mol of the silane compound containing a methyl group. In such a case, it is possible to more reliably prevent the occurrence of the agglomeration of inorganic oxide particles in a dispersion liquid to be produced due to the excess amount of water while causing the hydrolysis reaction of the silane compound containing a methyl group to sufficiently progress.

Alternatively, the content of water in the hydrolyzed liquid is, for example, preferably 1% by mass or more and 20% by mass or less, more preferably 1% by mass or more and 15% by mass or less, and still more preferably 1% by mass or more and 10% by mass or less. The content of water may be 2% by mass or more and 8% by mass or less, 3% by mass or more and 7% by mass or less, or 4% by mass or more and 6% by mass or less as necessary.

In addition, a catalyst may be added to the hydrolyzed liquid together with the silane compound containing a methyl group and water. As the catalyst, for example, an acid or a base can be used.

The acid catalyzes the hydrolysis reaction of the silane compound containing a methyl group in the hydrolyzed liquid. On the other hand, the base catalyzes a condensation reaction between the hydrolyzed silane compound containing a methyl group and functional groups on the surfaces of the metal oxide particles, for example, hydroxyl groups or silanol groups. This makes it easy for the silane compound containing a methyl group to be attached to the metal oxide particles in the dispersion step (step C) to be described below and improves the dispersion stability of the metal oxide particles.

Here, the above-described "acid" refers to an acid based on the so-called Bronsted-Lowry definition and refers to a substance that donates a proton in the hydrolysis reaction of the surface-modifying material such as the silane compound containing a methyl group. In addition, the above-described "base" refers to a base based on the so-called Bronsted-Lowry definition and, here, refers to a substance that accepts a proton in the hydrolysis reaction of the silane compound containing a methyl group and the following condensation reaction.

The acid is not particularly limited as long as the acid is capable of supplying a proton in the hydrolysis reaction of the silane compound containing a methyl group, and examples thereof include inorganic acids such as hydrochloric acid, hydrobromic acid, hydroiodic acid, sulfuric acid, nitric acid, boric acid, and phosphoric acid and organic acids such as acetic acid, citric acid and formic acid. These organic acids may be used singly or two or more organic acids may be used in combination.

The base is not particularly limited as long as the base is capable of accepting a proton in the hydrolysis reaction of the silane compound containing a methyl group, and examples thereof include sodium hydroxide, potassium hydroxide, barium hydroxide, calcium hydroxide, ammonia, amine, and the like. These bases may be used singly or two or more bases may be used in combination.

Among the above-described catalysts, the acid is preferably used as the catalyst. As the acid, the inorganic acid is preferable, and hydrochloric acid is more preferable from the viewpoint of the acidity.

The content of the catalyst in the hydrolyzed liquid is not particularly limited, but is preferably 10 ppm or more and 1000 ppm or less, more preferably 20 ppm or more and 800 ppm or less, and still more preferably 30 ppm or more and 600 ppm or less. In such a case, it is possible to suppress a side reaction of the silane compound containing a methyl group while sufficiently accelerating the hydrolysis of the silane compound containing a methyl group.

In addition, the hydrolyzed liquid may contain a hydrophilic solvent. The hydrophilic solvent further accelerates the hydrolysis reaction of this silane compound by accelerating the mixing of water and the silane compound in the hydrolyzed liquid.

Examples of such a hydrophilic solvent include a variety of hydrophilic solvents that can be contained in a dispersion liquid to be described below.

Among the above-described hydrophilic solvents, the hydrophilic solvent is preferably at least one selected from the group consisting of alcohol-based solvents and more preferably at least one of methanol and ethanol from the viewpoint of having excellent affinity to both water and hydrophobic solvents and accelerating the mixing thereof.

In addition, the content of the hydrophilic solvent in the hydrolyzed liquid is not particularly limited, but is, for example, preferably 60% by mass or less and more preferably 50% by mass or less. In such a case, it is possible to sufficiently increase the content of the silane compound and water in the hydrolyzed liquid. In addition, the content of the hydrophilic solvent in the hydrolyzed liquid is, for example, preferably 10% by mass or more and more preferably 15% by mass or more. In such a case, it is possible to further accelerate the mixing of the silane compound containing a methyl group and water and, consequently, to cause the hydrolysis reaction of the silane compound containing a methyl group to efficiently progress. The hydrolyzed liquid may not contain any hydrophilic solvents except for a compound derived from the hydrolysis reaction.

In the hydrolysis step, after being prepared, the hydrolyzed liquid may be held at a certain temperature for a predetermined time. This makes it possible for the hydrolysis of the silane compound to be further accelerated.

In this treatment, the temperature of the hydrolyzed liquid is not particularly limited and can be appropriately changed depending on the kind of the silane compound, but is, for example, preferably 5° C. or higher and 65° C. or lower and more preferably or higher and 60° C. or lower.

In addition, the holding time is not particularly limited and is, for example, preferably 10 minutes or longer and 180 minutes or shorter and more preferably 30 minutes or longer and 120 minutes or shorter.

While the hydrolyzed liquid is being held, the hydrolyzed liquid may be appropriately stirred.

(Step A (Second Hydrolysis Step))

Even in a case where a silane compound containing a hydrocarbon group having 2 or more carbon atoms (second silane compound) is used, when metal oxide particles are surface-modified, a second hydrolysis step of obtaining a hydrolyzed liquid of a silane compound containing a hydrocarbon group having 2 or more carbon atoms may be also carried out. The silane compound containing a hydrocarbon group having 2 or more carbon atoms may or may not have a methyl group.

In the second hydrolysis step, a silane compound containing a hydrocarbon group having 2 or more carbon atoms and water are mixed to obtain a hydrolyzed liquid containing a hydrolyzed silane compound containing a hydrocarbon group having 2 or more carbon atoms. The use of a liquid mixture in which at least a part of a silane compound containing a hydrocarbon group having 2 or more carbon atoms has been hydrolyzed in advance as described above makes it easy for the silane compound containing a hydrocarbon group having 2 or more carbon atoms to be attached to the metal oxide particles in the addition step F to be described below.

The second hydrolysis step can be carried out in the same manner as the first hydrolysis step by replacing the silane compound containing a methyl group in the first hydrolysis step with the silane compound containing a hydrocarbon group having 2 or more carbon atoms.

(Step B (Mixing Step): Primary Modification)

In the mixing step, the silane compound containing a methyl group (first silane compound) and the metal oxide particles are mixed to obtain a liquid mixture. The silane compound containing a methyl group may be the compound treated in the first hydrolysis step. In the mixing step, water or a catalyst may be mixed in addition to the silane compound containing a methyl group and the metal oxide particles. In the case of obtaining the hydrolyzed liquid by the above-described first hydrolysis step, the liquid mixture is obtained by mixing the hydrolyzed liquid and the metal oxide particles.

In addition, the hydrolyzed liquid and the metal oxide particles are mixed such that the content of the metal oxide particles in the liquid mixture is 10% by mass or more and 49% by mass or less and the total content of the silane compound containing a methyl group and inorganic oxide particles is 65% by mass or more and 98% by mass or less.

As described above, in the present embodiment, the total content of the silane compound containing a methyl group and the metal oxide particles in the liquid mixture is extremely large. In addition, an organic solvent or a dispersion medium such as water that has been considered as essential in the related art is not contained in the liquid mixture or is mixed in an extremely small amount. Alternatively, a small amount of an unavoidable alcohol compound is contained due to the hydrolysis. Even in such a case, the dispersion step makes it possible for the metal oxide particles to be uniformly dispersed in the liquid mixture and makes the silane compound containing a methyl group uniformly attached to the metal oxide particles (surface modification).

In more detail, generally, in a case where metal oxide particles are surface-modified by a surface-modifying material, such as a silane compound, in a liquid phase, it is common to mix not only the metal oxide particles and the surface-modifying material but also a dispersion medium to obtain a liquid mixture and carry out a dispersion treatment on the liquid mixture using a disperser. However, when the metal oxide particles which have been surface-modified by such a method are mixed with a methyl-based silicone resin, the metal oxide particles cannot be sufficiently dispersed in the methyl-based silicone resin and agglomerate, which results in a problem of the occurrence of turbidity such as white turbidity in the methyl-based silicone resin. In such a case, inorganic oxide particles that are added do not sufficiently exhibit intended performance.

On the other hand, the silane compound containing a methyl group that is used in the present invention has a low molecular weight and a relatively low viscosity. Furthermore, the silane compound has been hydrolyzed in the hydrolysis step described above and thereby has a favorable property of being attached to the metal oxide particles. Therefore, the silane compound containing a methyl group is extremely preferable for dispersion of the metal oxide particles in high-concentration silane compounds.

In a case where the total content of the silane compound containing a methyl group and the metal oxide particles is less than 65% by mass, components other than the above-described two components, for example, the dispersion medium, become too much. Therefore, there is a tendency that it is not possible to sufficiently attach the silane compound containing a methyl group to the surfaces of the metal oxide particles in the dispersion step (step C) to be described below. As a result, a large number of hydroxyl groups remain on the surfaces of the metal oxide particles, and, when a dispersion liquid to be obtained is mixed with a hydrophobic material, the metal oxide particles agglomerate, and turbidity occurs in the hydrophobic material. The total content of the silane compound containing a methyl group and the metal oxide particles needs to be 65% by mass or more and is preferably 70% by mass or more and more preferably 75% by mass or more.

In contrast, when the total content of the silane compound containing a methyl group and the metal oxide particles exceeds 98% by mass, the viscosity of the liquid mixture becomes too high, and it is not possible to sufficiently attach the silane compound containing a methyl group to the surfaces of the metal oxide particles in the dispersion step (step C) to be described below. The total content of the silane compound containing a methyl group and the metal oxide particles needs to be 98% by mass or less and is preferably 97% by mass or less and more preferably 95% by mass or less.

In addition, as described above, the content of the metal oxide particles in the liquid mixture is 10% by mass or more and 49% by mass or less. In such a case, it is possible to control the amount of the silane compound containing a methyl group with respect to the metal oxide particles to be within an appropriate range, to uniformly attach the silane compound containing a methyl group to the surfaces of the metal oxide particles, and to suppress an increase in the viscosity of the liquid mixture.

In contrast, in a case where the content of the metal oxide particles in the liquid mixture is less than 10% by mass, the amount of the silane compound containing a methyl group becomes excessive with respect to the metal oxide particles, and the excess silane compound containing a methyl group induces the agglomeration of the metal oxide particles in a dispersion liquid to be obtained. The content of the metal oxide particles in the liquid mixture is preferably 20% by mass or more and more preferably 30% by mass or more.

In addition, when the content of the metal oxide particles exceeds 49% by mass, the amount of the silane compound containing a methyl group is insufficient with respect to the metal oxide particles, and a sufficient amount of the silane compound containing a methyl group is not attached to the metal oxide particles. In addition, the content of the metal oxide particles becomes too large, consequently, the viscosity of the liquid mixture becomes too high, and it is not possible to sufficiently disperse the metal oxide particles in the dispersion step (step C) to be described below. The content of the metal oxide particles in the liquid mixture is preferably 45% by mass or less and more preferably 40% by mass or less.

The content of the silane compound containing a methyl group with respect to the content of the metal oxide particles in the liquid mixture is not particularly limited, but is, for example, preferably 100% by mass or more and 800% by mass or less, more preferably 140% by mass or more and 600% by mass or less, and still more preferably 180% by mass or more and 400% by mass or less. The content of the silane compound containing a methyl group may be 200% by mass or more and 300% by mass or less as necessary. In such a case, it is possible to control the amount of the silane compound containing a methyl group with respect to the metal oxide particles to be within an appropriate range and to uniformly attach the silane compound containing a methyl group to the surfaces of the metal oxide particles.

In addition, in the mixing step, an organic solvent may be further mixed with the liquid mixture. When an organic solvent is mixed with the liquid mixture, it becomes possible to control the reactivity of the silane compound, and it becomes possible to control the degree of attachment of the silane compound to the surfaces of the metal oxide particles. Furthermore, it becomes possible to adjust the viscosity of the liquid mixture due to the organic solvent.

Examples of such an organic solvent include the hydrophobic solvents or the hydrophilic solvents exemplified as the above-described dispersion medium of the dispersion liquid according to the present embodiment. These organic solvents may be used singly or two or more organic solvents may be used in combination.

The content of the organic solvent in the liquid mixture is not particularly limited as long as the content of the metal oxide particles and the silane compound containing a methyl group is satisfied. It is needless to say that the organic solvent may not be contained in the liquid mixture.

(Step C (Dispersion Step))

In the dispersion step, the metal oxide particles are dispersed in the liquid mixture obtained in the mixing step to obtain a first dispersion liquid in which the metal oxide particles are dispersed. In the present embodiment, the metal oxide particles are dispersed in a high concentration of the hydrolyzed silane compound containing a methyl group. Therefore, in the first dispersion liquid to be obtained, the silane compound containing a methyl group is relatively uniformly attached to the surfaces of the metal oxide particles, and the first dispersion liquid in which the metal oxide particles are relatively evenly dispersed is obtained.

The metal oxide particles can be dispersed with a well-known disperser. As the disperser, for example, a bead mill, a ball mill, a homogenizer, a disperser, a stirrer, or the like is preferably used.

Here, in the dispersion step, the metal oxide particles are preferably dispersed in the liquid mixture by imparting the minimum necessary amount of energy without imparting excess energy such that the particle diameters (dispersed-particle diameters) of the metal oxide particles become almost uniform in the dispersion liquid.

In addition, after the dispersion step, a solvent addition step D (first addition step) of obtaining a second dispersion liquid by adding a hydrophobic solvent to the first dispersion liquid (first addition step) may be provided.

Examples of the hydrophobic solvent include the hydrophobic solvents exemplified as the above-described dispersion medium of the dispersion liquid according to the present embodiment. These hydrophobic solvents may be used singly or two or more hydrophobic solvents may be used in combination.

(Step D (First Addition Step))

In the first addition step, a hydrophobic solvent is added to the first dispersion liquid to obtain a second dispersion liquid adjusted to a desired solid content (concentration).

The first dispersion liquid obtained in the dispersion step C has a high solid content (concentration) and thus has a high viscosity and poor handling properties. However, when a hydrophobic solvent is added to the obtained first dispersion liquid in order to reduce the solid content, since the hydrophobicity of the surfaces of the particles is poor, the particles agglomerate, and a uniform dispersion liquid cannot be obtained.

Therefore, the present inventors and the like found that, when the obtained first dispersion liquid is heated, and a hydrophobic solvent is gradually added thereto, it is possible to adjust the solid content of the dispersion liquid to be low.

The mechanism is presumed as follows.

When the first dispersion liquid is heated, the polymerization of the silane compound containing a methyl group attached to the metal oxide particles proceeds, and the hydrophobicity of the surfaces of the particles improves. Even when the polymerization reaction proceeds excessively, the metal oxide particles agglomerate. Therefore, when a hydrophobic solvent is gradually added to the first dispersion liquid under the progress of the polymerization reaction, the surfaces are gradually hydrophobilized while an excessive polymerization reaction is suppressed. Therefore, it is possible to gradually mix a hydrophobic solvent with the first dispersion liquid.

That is, the hydrophobic solvent is added to an extent that the metal oxide particles do not agglomerate, and the polymerization reaction of the silane compound containing a methyl group is made to proceed to an extent that the silane compound is compatible with the hydrophobic solvent added, whereby a dispersion liquid having a solid content adjusted to a desired value can be obtained.

As described above, the hydrophobic solvent needs to be added gradually so that the metal oxide particles do not agglomerate. Therefore, the solvent may be added after the first dispersion liquid is heated, the first dispersion liquid may be heated after the hydrophobic solvent is added, or the heating of the first dispersion liquid and the addition of the hydrophobic solvent may be carried out at the same time.

That is, the first addition step may be a step d1 of heating the first dispersion liquid and then adding the hydrophobic solvent at a rate at which the metal oxide particles do not agglomerate, may be a step d2 of adding the hydrophobic solvent at a rate at which the metal oxide particles do not agglomerate while heating the first dispersion liquid, or may be a step d3 of adding the hydrophobic solvent at a rate at which the metal oxide particles do not agglomerate and then heating the first dispersion liquid.

The rate at which the metal oxide particles do not agglomerate is not particularly limited. For example, the hydrophobic solvent may be continuously added at a rate at which the solid content decreases in a range of 3% by mass or more and 20% by mass or less within 1 hour. The amount of the hydrophobic solvent added needs to be appropriately adjusted so that the amount of the hydrophobic solvent added is large when the heating temperature is high and the amount of the hydrophobic solvent added is small when the heating temperature is low.

For example, the hydrophobic solvent needs to be added stepwise every 30 minutes, every hour, or every 2 hours so that the solid content decreases in a range of 3% by mass or more and 20% by mass or less. The amount of the hydrophobic solvent added needs to be appropriately adjusted so that the amount of the hydrophobic solvent added at one time is large when the heating temperature is high and the amount of the hydrophobic solvent added at one time is small when the heating temperature is low.

The heating temperature is not particularly limited as long as the heating temperature is a temperature at which the polymerization reaction of the silane compound containing a methyl group proceeds. The heating temperature is preferably, for example, 35° C. or higher and 80° C. or lower. When the heating temperature is 35° C. or higher, it is possible to make the polymerization reaction of the silane compound containing a methyl group proceed. On the other hand, when the heating temperature is or lower, it is possible to suppress the agglomeration of the metal oxide particles due to a rapid reaction of the silane compound containing a methyl group.

The heating time may be appropriately carried out until the adjustment of the solid content is completed and is, for example, preferably 4 hours or longer and 12 hours or shorter. When the heating time is 4 hours or longer, the polymerization reaction of the silane compound containing a methyl group proceeds, and it becomes possible to mix the silane compound containing a methyl group with the hydrophobic solvent. On the other hand, when the heating time is 12 hours or shorter, it is possible to suppress the agglomeration of the metal oxide particles due to the excessive progress of the polymerization reaction of the silane compound containing a methyl group.

From the viewpoint of easiness in handleability in the removal of the dispersion medium or the like during the production of a composition to be described below, as the hydrophobic solvent, at least one selected from the group consisting of toluene, o-xylene, m-xylene, p-xylene, and benzene is preferably used, and toluene is more preferably used.

The content of the hydrophobic solvent contained in the final second dispersion liquid needs to be appropriately adjusted so as to obtain a desired solid content. The content of the hydrophobic solvent is, for example, preferably 40% by mass or more and 95% by mass or less, more preferably 50% by mass or more and 90% by mass or less, and still more preferably 60% by mass or more and 80% by mass or less.

The first addition step makes it possible to obtain a second dispersion liquid having a solid content adjusted to a desired value. The use of the second dispersion liquid improves the handleability of the dispersion liquid in the following steps.

(Step E (Removal Step))

In the present embodiment, a step E of removing an alcohol generated by hydrolysis may be provided after the step D.

It is presumed that the provision of the removal step improves the production efficiency of the composition to be described below.

A removal method is not particularly limited, and, for example, an evaporator can be used. The removal step may be carried out until the alcohol is completely removed or about 5% by mass of the alcohol may remain.

(Step F (Second addition Step): Secondary Modification)

In a second addition step, a silicone compound containing a hydrocarbon group having 2 or more carbon atoms is added to the second dispersion liquid to obtain a third dispersion liquid. As described above, in the second dispersion liquid, the silane compound containing a methyl group (first silane compound) is relatively uniformly attached to the surfaces of the metal oxide particles. Therefore, the silicone compound is made to be relatively uniformly present near the surfaces of the metal oxide particles through the silane compound containing a methyl group.

In the second addition step, a liquid mixture (third dispersion liquid) obtained by mixing a silicone compound with the second dispersion liquid may be held at a predetermined temperature for a predetermined time. This makes it possible to further accelerate the surface modification of the metal oxide particles by the silicone compound.

Examples of the silicone compound include the above-described silicone compounds. These silicone compounds may be used singly or two or more silicone compounds may be used in combination.

The silicone compound can be added to the second dispersion liquid such that the content of the silicone compound in the second dispersion liquid preferably becomes, for example, 10% by mass or more and 500% by mass or less with respect to the amount of the metal oxide particles. In addition, in consideration of the amount of the methyl groups contained in the silane compound and the hydrocarbon groups having 2 or more carbon atoms contained in the silicone compound, the silicone compound is added such that the methyl group/carbon numbers in the metal oxide particles becomes 0.01 or more and 10 or less. In such a case, it is possible to attach a sufficient amount of the silicone compound to the surfaces of the metal oxide particles, the dispersion stability of the metal oxide particles is improved, and it is possible to improve the dispersibility into silicone resins for LEDs. Furthermore, it is possible to reduce the amount of the silicone compound isolated and to suppress unintended agglomeration of the metal oxide particles in silicone resins for LEDs.

In the second addition step, the holding temperature is not particularly limited and can be appropriately changed depending on the kind of the silicone compound, but is, for example, preferably 40° C. or higher and 150° C. or lower and more preferably 50° C. or higher and 140° C. or lower.

In addition, the holding time is not particularly limited, but is, for example, preferably 1 hour or longer and 24 hours or shorter and more preferably 2 hours or longer and 20 hours or shorter.

During the above-described holding, the third dispersion liquid may be appropriately stirred.

In addition, in the second addition step, a treatment by one or more kinds of the silicone compounds may be carried out once or a plurality of times. For example, when the treatment with the silicone compound is carried out a plurality of times using different kinds of silicone compounds, the control of the surface state of the metal oxide particles in accordance with the kind of the methyl-based silicone resin becomes easier.

In addition, in the second addition step, the hydrophobic solvent may be added so as to obtain a desired solid content by measuring the solid content after the treatment with the silicone compound. When the solid content is decreased, the mixing with a silicone resin component to be described below becomes easy.

In addition, in the second addition step, a silane compound containing a methyl group or a silane compound containing a hydrocarbon group having 2 or more carbon atoms may be added. Addition of these silane compounds makes it easy to adjust the ratio of methyl group/hydrocarbon group.

As the silane compound containing a methyl group or the silane compound containing a hydrocarbon group having 2 or more carbon atoms, the hydrolyzed liquid containing the first silane compound obtained by the above-described first hydrolysis step or the hydrolyzed liquid containing the second silane compound obtained by the second hydrolysis step may be used.

The amount of the silane compound added in the case of being added in the second addition step, including the amount of the silane compound containing a methyl group mixed in the mixing step B, becomes, for example, 100% by mass or more and 700% by mass or less with respect to the amount of the metal oxide particles.

In addition, in the second addition step, in a case where a silane compound containing a hydrocarbon group having 2 or more carbon atoms is added, the silane compound is added so that the mole ratio of the methyl groups to the hydrocarbon groups having 2 or more carbon atoms becomes 0.01 or more and 10 or less in consideration of the amount of the hydrocarbon groups contained in the silicone compound as well.

In the second addition step, the silane compound and the silicone compound may be added at the same time, the silicone compound may be added after the silane compound is added, or the silane compound may be added after the silicone compound is added.

The third dispersion liquid in which the metal oxide particles to which the silane compound containing a methyl group has been attached are surface-modified by the silicone compound can be obtained as described above.

In the dispersion liquid containing the surface-modified metal oxide particles produced using the method for producing surface-modified metal oxide particles according to the present embodiment, the surfaces of the metal oxide particles are densely and sufficiently modified by the silane compound containing a methyl group or a methyl group and a hydrocarbon group having 2 or more carbon atoms, and, furthermore, the silicone compound containing a hydrocarbon group having 2 or more carbon atoms is present near the surfaces of the metal oxide particles. In addition, in the method for modifying the surface of metal oxide particles according to the present embodiment, it is possible to densely and sufficiently modify the surfaces of metal oxide particles by a silane compound containing a methyl group or a methyl group and a hydrocarbon group having 2 or more carbon atoms and, furthermore, to make a silicone compound containing a hydrocarbon group having 2 or more carbon atoms present near the surfaces of the metal oxide particles. In addition, the surface-modified metal oxide particles which have been surface-modified as described above have excellent compatibility with both methyl-based silicone resins for LEDs and phenyl-based silicone resins and can be relatively uniformly dispersed in both resins. Therefore, in a case where the surface-modified metal oxide particles have been dispersed in any of a methyl-based silicone resin or a phenyl-based silicone resin, the occurrence of turbidity such as white turbidity is suppressed. Furthermore, changes in the viscosities of silicone resins for LEDs containing the surface-modified metal oxide particles are also suppressed.

4. Composition

Next, a composition according to the present embodiment will be described.

The composition according to the present embodiment contains a dispersion liquid containing the above-described surface-modified metal oxide particles and a silicone resin component. That is, the composition according to the present embodiment is a mixture of the above-described dispersion liquid and a silicone resin component. Therefore, the composition according to the present embodiment contains, in addition to the metal oxide particles which have been surface-modified by a silane compound containing a methyl group or a methyl group and a hydrocarbon group having 2 or more carbon atoms and a solvent, a silicone resin component.

Here, the silicone resin component means that the silicone resin is in a fluid state before curing.

The composition according to the present embodiment can be used as a sealing member for light-emitting elements by being cured as described below. The composition according to the present embodiment contains the above-described metal oxide particles contributing to improvement in the refractive index and transparency and is thus capable of improving the brightness of light of light-emitting devices when being used for sealing members.

Furthermore, since the composition according to the present embodiment contains surface-modified metal oxide particles in which the silane compound containing a methyl group and the silicone compound containing a hydrocarbon group having 2 or more carbon atoms are sufficiently attached to metal oxide particles so as to satisfy the expression (1), even in a case where the silicone resin component is contained or even after the silicone resin component is cured, the agglomeration of the metal oxide particles is suppressed, and the deterioration of the transparency is suppressed. Therefore, it is possible to improve the brightness of light of light-emitting devices at the time of using the composition according to the present embodiment as sealing members.

From the viewpoint of obtaining a highly transparent composition, the content of the metal oxide particles in the composition of the present embodiment is preferably 5% by mass or more and 50% by mass or less, more preferably 5% by mass or more and 40% by mass or less, and still more preferably 10% by mass or more and 35% by mass or less.

In addition, the contents of the silane compound containing a methyl group and the silicone compound containing a hydrocarbon group having 2 or more carbon atoms can correspond to the contents in the surface-modified metal oxide particles according to the present embodiment.

The silicone resin component is a main component in the composition according to the present embodiment. When the composition according to the present embodiment is used as a sealing material, the silicone resin component cures and seals a light-emitting element and thereby prevents deterioration factors from external environments, such as moisture and oxygen, from reaching the light-emitting element. In addition, in the present embodiment, a cured product that is obtained from the silicone resin component is basically transparent and is capable of transmitting light that is emitted from light-emitting elements.

The silicone resin component is not particularly limited as long as the silicone resin component is a silicone resin component for LEDs that is intended to seal LEDs. The silicone resin component preferably contains a methyl group and a phenyl group. The silicone resin component may be a methyl-based silicone resin component or a phenyl-based silicone resin component. The methyl-based silicone resin component means a silicone resin component containing many methyl groups. The methyl-based silicone resin component may be a methyl group-containing silicone resin component, may be a methylphenyl silicone resin component, or may be a dimethyl silicone resin component. A methylphenyl silicone resin component is preferable from the viewpoint of high versatility.

The phenyl-based silicone resin component means a silicone resin component containing many phenyl groups. The phenyl-based silicone resin component may be a phenyl group-containing silicone resin component, may be a methylphenyl silicone resin component, or may be a diphenyl silicone resin. A methylphenyl silicone resin component is preferable from the viewpoint of high versatility.

The content of the silicone resin component in the composition according to the present embodiment can be set to be the remainder of the other components and is, for example, preferably 10% by mass or more and 70% by mass or less. The content of the silicone resin component may be 20% by mass or more and 60% by mass or less, 30% by mass or more and 50% by mass or less, or 35% by mass or more and 45% by mass or less.

The mass ratio of the silicone resin component to the surface-modified metal oxide particles in the composition according to the present embodiment is preferably within a range of 50:50 to 90:10 and more preferably within a range of 60:40 to 80:20 (silicone resin: surface-modified metal oxide particles).

A solvent derived from the dispersion liquid according to the present embodiment may be contained in or removed from the composition according to the present embodiment. That is, the dispersion liquid-derived solvent may be completely removed or may remain in an amount of about 1% by mass or more and 10% by mass or less or may remain in an amount of about 2% by mass or more and 5% by mass or less in the composition.

The composition according to the present embodiment may contain the particles of a fluorescent body as long as the object of the present invention is not impaired. The particles of a fluorescent body absorb light having a specific wavelength that is emitted from light-emitting elements and release light having a predetermined wavelength. That is, it becomes possible to convert the wavelength of light and, furthermore, adjust the color tone with the particles of a fluorescent body.

The particles of a fluorescent body are not particularly limited as long as the particles can be used light-emitting devices as described below and can be appropriately selected and used such that the color of light emitted from light-emitting devices becomes a desired color.

The content of the particles of a fluorescent body in the composition according to the present embodiment can be appropriately adjusted and used such that a desired brightness can be obtained.

In addition, the composition according to the present embodiment may also contain an additive that is generally used such as a preservative, a polymerization initiator, a polymerization inhibitor, a curing catalyst, or a light scattering agent as long as the object of the present invention is not impaired. As the light scattering agent, silica particles having an average particle diameter of 1 µm or more and 30 µm or less are preferably used.

Since the composition according to the present embodiment contains surface-modified metal oxide particles in which the silane compound containing a methyl group and the silicone compound containing a hydrocarbon group having 2 or more carbon atoms are sufficiently attached to metal oxide particles so as to satisfy the expression (1), even when the silicone resin component is a methyl-based silicone resin or a phenyl-based silicone resin, the agglomeration of the metal oxide particles is suppressed, and the deterioration of the transparency is suppressed. Therefore, it is possible to form sealing members that improve the brightness of light of light-emitting devices using the composition according to the present embodiment.

5. Method for Producing Composition

Next, a method for producing a composition according to the present embodiment will be described.

The method for producing a composition according to this embodiment has a step H of adding a silicone resin component to the third dispersion liquid obtained by the above-described method for producing surface-modified metal oxide particles to obtain a composition.

(Step G (Third Addition Step))

In a third addition step, a silicone resin component is added to the third dispersion liquid to adjust the composition to a desired solid content (concentration).

The content of the silicone resin component contained in the final composition needs to be appropriately adjusted so as to obtain a desired solid content. The content of the silicone resin component is preferably, for example, 10% by mass or more and 70% by mass or less.

The third addition step makes it possible to obtain a composition having a solid content adjusted to a desired value.

(Step H (Removal Step))

In the present embodiment, the step H of removing the solvent contained in the third dispersion liquid may be provided after the step G.

A removal method is not particularly limited, and, for example, an evaporator can be used. The removal step may be carried out until the solvent is completely removed or about 5% by mass of the alcohol may remain.

The composition according to the present embodiment can be obtained as described above.

6. Sealing Member

A sealing member according to the present embodiment is a cured product of the composition according to the present embodiment. The sealing member according to the present embodiment is generally used as a sealing member that is disposed on light-emitting elements or a part thereof.

The thickness or shape of the sealing member according to the present embodiment can be appropriately adjusted depending on desired uses or characteristics and is not particularly limited.

The sealing member according to the present embodiment can be produced by curing the composition according to the present embodiment as described above. A method for curing the composition can be selected depending on the characteristics of the silicone resin in the composition according to the present embodiment, and examples thereof include heat curing, electron beam curing, and the like. More specifically, the sealing member of the present embodiment can be obtained by curing the silicone resin in the composition according to the present embodiment by an addition reaction or a polymerization reaction.

The average dispersed-particle diameter of the metal oxide particles in the sealing member is preferably 10 nm or more and 300 nm or less, more preferably 20 nm or more and 250 nm or less, and still more preferably 30 nm or more and 200 nm or less.

The average dispersed-particle diameter of the metal oxide particles in the sealing member is a number distribution-based average particle diameter (median diameter) which is measured by the transmission electron microscopic observation (TEM) of the sealing member. In addition, the average dispersed-particle diameter of the metal oxide particles in the sealing member according to the present embodiment is a value that is measured and calculated based on the dispersed-particle diameters of the metal oxide particles in the sealing member. The average dispersed-particle diameter is measured and calculated based on the diameters of the metal oxide particles in a dispersed state regardless of whether the metal oxide particles are in a primary particle or secondary particle state. In addition, in the present embodiment, the average particle diameter of the metal oxide particles in the sealing member may be measured as the average particle diameter of the metal oxide particles which have been surface-modified by the silane compound and the silicone compound. In the sealing member, since metal oxide particles which have been surface-modified by the silane compound and the silicone compound and metal oxide particles which have been surface-modified by neither a silane compound nor a silicone compound can be present, usually, the average particle diameter of the metal oxide particles in the sealing member is measured as a value in a mixed state thereof.

The sealing member according to the present embodiment is a cured product of the composition according to the present embodiment and is thus excellent in terms of the refractive index and transparency. Therefore, according to the present embodiment, it is possible to obtain a sealing member having an excellent extraction efficiency that improves the brightness of light of light-emitting devices.

7. Light-Emitting Device

Next, a light-emitting device according to the present embodiment will be described. The light-emitting device according to the present embodiment includes the above-described sealing member and a light-emitting element sealed with the sealing member.

Examples of the light-emitting element include a light-emitting diode (LED), an organic light-emitting diode (OLED), and the like. Particularly, the sealing member according to the present embodiment is suitable for the sealing of light-emitting diodes.

Hereinafter, the light-emitting device according to the present embodiment will be described using an example in which the light-emitting element is a light-emitting diode on a chip, that is, an LED chip, and the light-emitting device is an LED package.

FIG. 1 to FIG. 4 each are schematic views (cross-sectional views) showing examples of the light-emitting device according to the embodiment of the present invention.

The sizes of individual members in the drawings are appropriately stressed in order to facilitate the description and do not indicate actual dimensions and ratios between the members. In the present specification and the drawings, configurational elements having substantially the same functional configuration will be given the same reference sign and will not be described again.

A light-emitting device (LED package) 1A shown in FIG. 1 includes a substrate 2 having a recess portion 21, a light-emitting element (LED chip) 3 that is disposed on a bottom surface of the recess portion 21 of the substrate 2, and a sealing member 4A that seals and covers the light-emitting element 3 in the recess portion 21.

The sealing member 4A is configured using the above-described sealing member according to the present embodiment. Therefore, in the sealing member 4A, the above-described metal oxide particles derived from the composition according to the present embodiment are dispersed, and, consequently, the extraction efficiency of light in the light-emitting device 1A improves. In addition, particles of a fluorescent body 5 are dispersed in the sealing member 4A. The particles of a fluorescent body 5 convert the wavelength of at least a part of light that is released from the light-emitting element 3.

Figure 2:
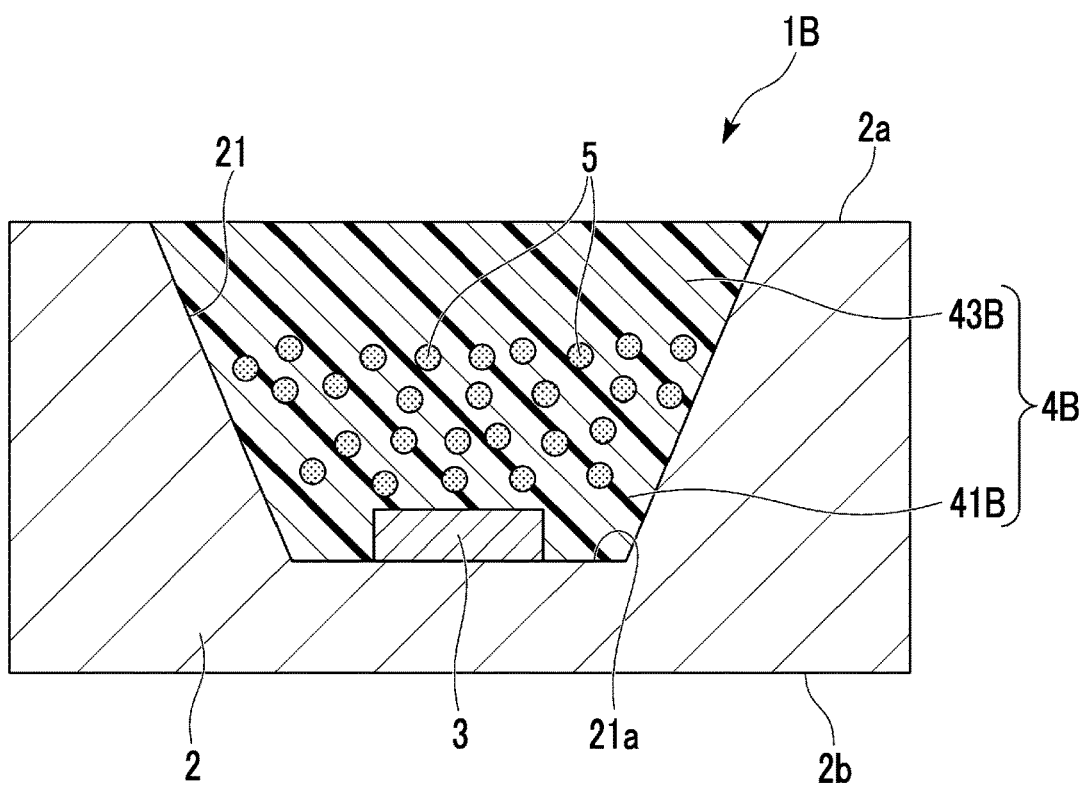
FIG. 2 is a schematic pattern diagram showing another preferable example of the light-emitting device according to the embodiment of the present invention.

A light-emitting device 1B shown in FIG. 2 is different from the light-emitting device 1A in terms of the fact that a sealing member 4B forms two layers. That is, the sealing member 4B has a first layer 41B that directly covers the light-emitting element 3 and a second layer 43B that covers the first layer 41B. The first layer 41B and the second layer 43B are both the sealing member according to the present embodiment. The particles of a fluorescent body 5 are dispersed in the first layer 41B. On the other hand, the second layer 43B does not include the particles of a fluorescent body 5. In the light-emitting device 1B, the above-described metal oxide particles derived from the composition according to the present embodiment are dispersed in the first layer 41B and the second layer 43B that configure the sealing member 4B, whereby the brightness of light improves.

Figure 3:
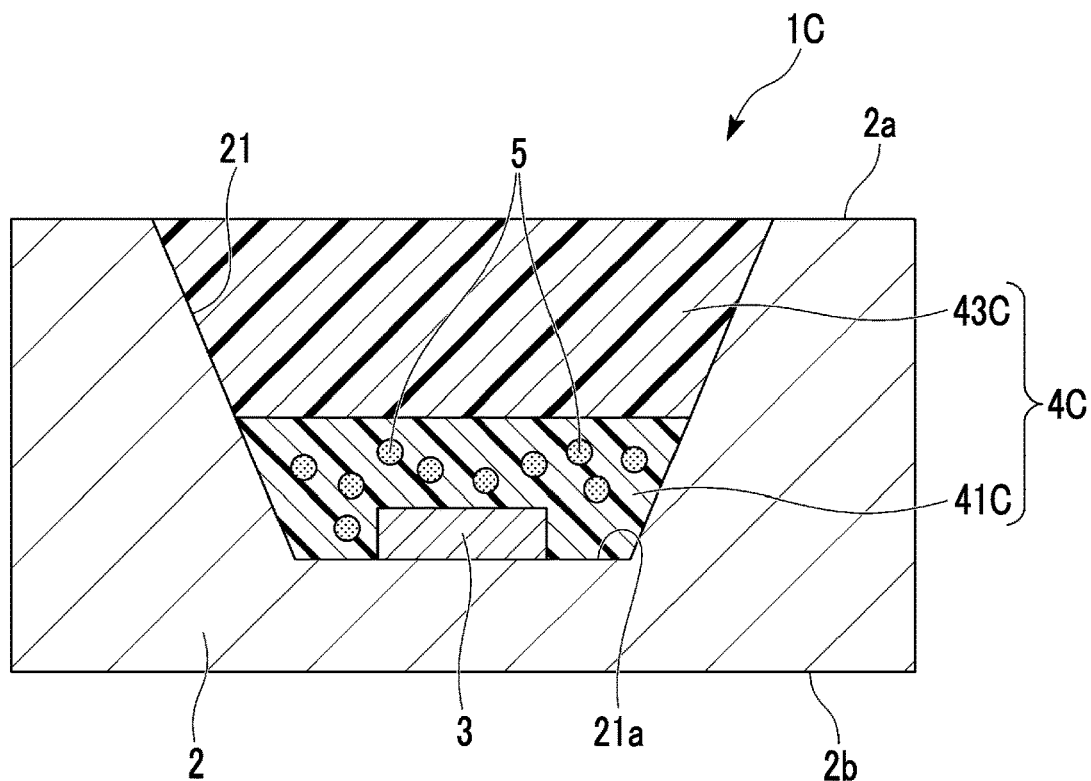
FIG. 3 is a schematic pattern diagram showing still another preferable example of the light-emitting device according to the embodiment of the present invention.

A light-emitting device 1C shown in FIG. 3 is also different from the light-emitting device 1A in terms of the fact that the configuration of a sealing member 4C is different from that of the sealing member 4A. The sealing member 4C has a first layer 41C that directly covers the light-emitting element 3 and a second layer 43C that covers the first layer 41C. The first layer 41C is not the sealing member according to the present embodiment, is a sealing member of a resin not containing the above-described metal oxide particles, and is configured using a resin or the like that can be used for sealing members. In addition, the particles of a fluorescent body 5 are dispersed in the first layer 41C. On the other hand, the second layer 43C is the sealing member according to the present embodiment. In the light-emitting device 1C, the above-described metal oxide particles derived from the composition according to the present embodiment are dispersed in the second layer 43C that configures the sealing member 4C, whereby the extraction efficiency of light improves.

Figure 4:
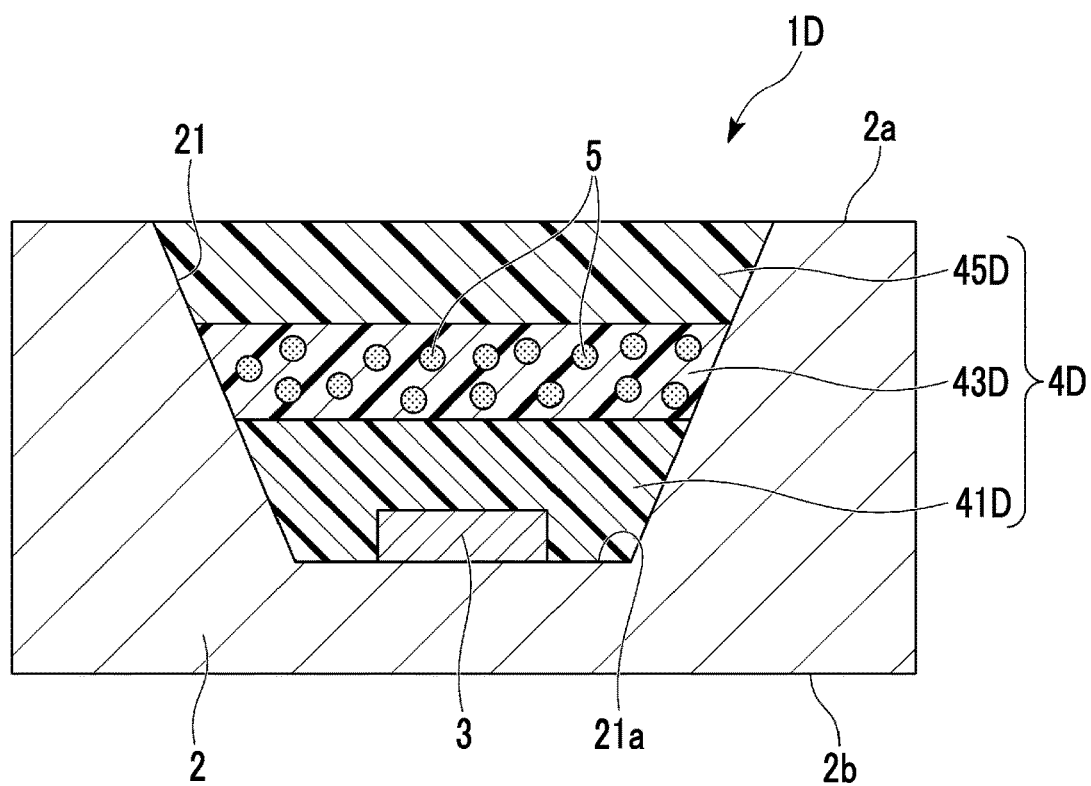
FIG. 4 is a schematic pattern diagram showing far still another preferable example of the light-emitting device according to the embodiment of the present invention.

In a light-emitting device 1D shown in FIG. 4, a sealing member 4D has a first layer 41D that directly covers the light-emitting element 3, a second layer 43D that covers the first layer 41D, and a third layer 45D that further covers the second layer 43D. The first layer 41D and the second layer 43D are not the sealing member according to the present embodiment, are a sealing member of a resin not containing the above-described metal oxide particles, and are configured using a resin or the like that can be used for sealing members. In addition, the particles of a fluorescent body 5 are dispersed in the second layer 43D. On the other hand, the third layer 45D is the sealing member according to the present embodiment. In the light-emitting device 1D, the above-described metal oxide particles derived from the composition according to the present embodiment are dispersed in the third layer 45D that configures the sealing member 4D, whereby the brightness of light improves.

The light-emitting device according to the present embodiment is not limited to the aspects shown in the drawings. For example, the light-emitting device according to the present embodiment may not include the particles of a fluorescent body in the sealing member. In addition, the sealing member according to the present embodiment can be present in a random location in the sealing member.

In the light-emitting device according to the present embodiment, since the light-emitting element is sealed with the sealing member of the present embodiment, the brightness of light improves.

In addition, in the light-emitting device according to the present embodiment, the light-emitting element is sealed with the above-described composition according to the present embodiment. Therefore, the present invention also relates to a method for producing a light-emitting device, the method having a step of sealing a light-emitting element using the composition according to the present embodiment in a sense. In the same sense, the above-described production method may also have a step of mixing the dispersion liquid according to the present embodiment and a resin component to obtain the composition.

The light-emitting element can be sealed by, for example, imparting the composition according to the present embodiment onto the light-emitting element using a dispenser or the like and then curing the composition.

8. Illumination Tool and Display Device

The above-described light-emitting device according to the present embodiment can be used in, for example, illumination tools and display devices. Therefore, the present invention also relates to an illumination tool or a display device including the light-emitting device according to the present embodiment in a sense.

Examples of the illumination tool include an ordinary illumination tool such as an indoor lamp or an outdoor lamp, an illumination in a switch portion of an electronic device such as a mobile phone or OA equipment, and the like.

Since the illumination tool according to the present embodiment includes the light-emitting device according to the present embodiment, even when the same light-emitting element is used, the luminous flux being emitted becomes large compared with that in the related art, and it is possible to make the ambient environment brighter.

Examples of the display device include a mobile phone, a mobile information terminal, an electronic dictionary, a digital camera, a computer, a television, a peripheral device thereof, and the like.

Since the display device according to the present embodiment includes the light-emitting device according to the present embodiment, even when the same light-emitting element is used, the luminous flux being emitted becomes large compared with that in the related art, and it is possible to carry out displaying, for example, in a clearer and brighter manner.

EXAMPLES

Hereinafter, the present invention will be described in more detail using examples and comparative examples. The examples to be described below are simply examples of the present invention and do not limit the present invention. cl Example 1
(Preparation of Dispersion Liquid)
(1) First Hydrolysis Step As a first silane compound, 90.78 parts by mass of methyltrimethoxysilane (product name: KBM-13, manufactured by Shin-Etsu Chemical Co., Ltd.), 9.21 parts by mass of water, and 0.01 parts by mass of hydrochloric acid (1N) were added and mixed to obtain a hydrolyzed liquid. Next, this hydrolyzed liquid was stirred at 60° C. for 30 minutes, and a hydrolysis treatment of methyltrimethoxysilane was carried out, thereby obtaining a hydrolyzed liquid.

(2) Mixing Step (Primary Modification)

30 Parts by mass of zirconium oxide ($ZrO_2$) particles having an average primary particle diameter of 12 nm (manufactured by Sumitomo Osaka Cement Co., Ltd.) and 70 parts by mass of the hydrolyzed liquid were mixed to obtain a liquid mixture. The content of the zirconium oxide particles in the liquid mixture was 30% by mass, the content of methyltrimethoxysilane was 63.5% by mass, and the total content of the zirconium oxide particles and methyltrimethoxysilane was 93.5% by mass.

(3) Dispersion Step

After this liquid mixture was dispersed in a bead mill for 6 hours, beads were removed, and a first dispersion liquid was obtained.

As a result of measuring the solid content of the first dispersion liquid (at 100° C. for 1 hour), the solid content was 70% by mass.

(4) First Addition Step

The obtained first dispersion liquid was heated at 60° C. for 2 hours. Next, toluene was added to the dispersion liquid such that the solid content became 40% by mass, and the dispersion liquid was heated at 60° C. for 2 hours.

Next, toluene was added to the dispersion liquid such that the solid content became 30% by mass, and the dispersion liquid was heated at 60° C. for 1 hour.

Next, toluene was added to the dispersion liquid such that the solid content became 20% by mass, and the dispersion liquid was heated at 60° C. for 1 hour, thereby obtaining a second dispersion liquid.

(FT-IR Analysis)

A part of the second dispersion liquid was fractionated and dried with a vacuum dryer. Next, 0.01 g to 0.05 g of the obtained surface-modified zirconium oxide particles were used, and the transmission spectrum in a wavenumber range of 800 $cm^{-1}$ or more and 3,800 $cm^{-1}$ or less was measured with a Fourier transform infrared spectrophotometer (Model No.: FT/IR-670 Plus, manufactured by JASCO Corporation). The values of the transmission spectrum were standardized such that the maximum value of the transmission spectrum in this measurement range became 100 and the minimum value became 0, and a spectrum value standardized at 3,500 $cm^{-1}$ (IA) and a spectrum value standardized at 1,100 $cm^{-1}$ (IB) were obtained. As a result, IA/IB was 7.

(5) Second Addition Step (Secondary Modification)

66.7 parts by mass of the second dispersion liquid having a solid content adjusted with toluene to 15% by mass and 33.3 parts by mass of a silicone compound containing a methyl group and a phenyl group (trade name: KR213 (high phenyl content), manufactured by Shin-Etsu Chemical Co., Ltd.) were mixed and stirred at 100° C. for 3 hours, thereby obtaining a dispersion liquid (third dispersion liquid) of Example 1.

(Evaluation of Dispersion Liquid)
(1) FT-IR Analysis 10 g of the dispersion liquid according to Example 1 having a solid content adjusted to 30% by mass with toluene was dried under conditions of 100° C. and 20 hPa for 2 hours using a vacuum dryer (manufactured by EYELA Tokyo Rikakikai Co., Ltd., device name: VACUUM OVEN VOS-201SD). Next, 0.01 g to 0.05 g of the obtained metal oxide particles were used, and the transmission spectrum in a wavenumber range of 800 $cm^{-1}$ or more and 3,800 $cm^{-1}$ or less was measured with a Fourier transform infrared spectrophotometer (Model No.: FT/IR-670 Plus, manufactured by JASCO Corporation). The values of the spectrum were standardized such that the maximum value of the spectrum in this measurement range became 100 and the minimum value became 0, and a spectrum value standardized at 3,500 $cm^{-1}$ (IA) and a spectrum value standardized at 1,100 $cm^{-1}$ (IB) were obtained. As a result, IA/IB was 1.9. The results are shown in Table 1.

(2) NMR Measurement 15 g of the dispersion liquid according to Example 1 in which the solid content was adjusted to 30% by mass with toluene and 15 g of methanol were mixed to precipitate surface-modified zirconium oxide particles. This liquid mixture was separated into solid and liquid with a centrifuge to recover a solid portion (surface-modified zirconium oxide particles). Several milligrams of the recovered surface-modified zirconium oxide particles are collected and dissolved in heavy chloroform so as to become 1% by mass. The $^1$H-liquid NMR spectrum of the phenyl group and the methyl group was measured using this solution and a tabletop NMR device (manufactured by Nanalysis Scientific Corp., Model No. NMReady60Pro ($^1H/^{19}F$)). The peak areas (integral values) of the phenyl group and the methyl group were each calculated from the obtained spectrum, and the integral value of the methyl group/the integral value of the phenyl group was calculated to calculate the mole ratio of the methyl groups to the phenyl groups. The results are shown in Table 1.

The mole ratio of the methyl groups to the phenyl groups (methyl group/phenyl group) was 0.45. The results are shown in Table 1.

(Preparation of Composition A)

16.7 g of the dispersion liquid according to Example 1 having a solid content adjusted to 30% by mass with toluene was mixed with 95 g of a methyl-based silicone resin component (trade name: KER-2500-A/B, manufactured by Shin-Etsu Chemical Co., Ltd.). Next, toluene was removed from this liquid mixture with an evaporator, thereby obtaining a composition A according to Example 1 containing the methyl-based silicone resin component.

The viscosity of the obtained composition A was measured using a rheometer (trade name: RHEOSTRESS RS-6000, manufactured by HAAKE) under conditions of 25° C. and a shear rate of 1 (1/s).

As a result, the viscosity A of composition A was 8 Pa·s. The results are shown in Table 1.

(Preparation of Cured Product A)

This composition was loaded into a TEFLON (registered trademark)-coated 1 mm-thick SUS container such that the thickness became 1 mm. Next, the composition was heated at 100° C. for 2 hours and then heated at 150° C. for 4 hours to obtain a cured product A according to Example 1. The thickness of the cured product A taken out from the container was about 1 mm.

The transmittance of the cured product A taken out from the container was measured with a spectrophotometer (manufactured by JASCO Corporation, Model No.: V-770) using an integrating sphere. The transmittance A of the cured product A containing the methyl-based silicone resin was 70%. The results are shown in Table 1.

(Preparation of Composition B and Cured Product B)

16.7 g of the dispersion liquid according to Example 1 having a solid content adjusted to 30% by mass with toluene was mixed with 95 g of a phenyl-based silicone resin component (trade name: 0E-6520, manufactured by Dow Toray Co., Ltd.). Next, toluene was removed from this liquid mixture with an evaporator, thereby obtaining a composition B according to Example 1 containing the phenyl-based silicone resin component. The viscosity B of the composition B measured in the same manner as the composition A is shown in Table 1.

Next, the composition was cured in the same manner as the composition A, thereby obtaining a cured product B according to Example 1. The thickness of the cured product B taken out from the container was about 1 mm. The transmittance B measured in the same manner as for the cured product A is shown in Table 1.

(Preparation of LED Package and Evaluation of Brightness)

(1) Preparation of Composition 5.0 g of the dispersion liquid according to Example 1 having a solid content adjusted to 30% by mass with toluene was mixed with 3.5 g of a methyl-based silicone resin component (trade name: KER-2500-B, manufactured by Shin-Etsu Chemical Co., Ltd.). That is, the dispersion liquid and methyl phenyl silicone were mixed such that the mass ratio of the total mass of zirconia and the surface-modifying material to the methyl-based silicone resin component became 30:70.

Next, toluene was removed from this liquid mixture with an evaporator, thereby obtaining a composition C according to Example 1 for preparing a sealing member.

(2) Preparation of LED Package

14 Parts by mass of a methyl-based silicone resin component (trade name: KER-2500-A/B, manufactured by Shin-Etsu Chemical Co., Ltd.) was added to 1 part by mass of the obtained composition C such that the surface-modified zirconium oxide particles were adjusted to be 2% by mass in the composition and mixed together. A composition obtained by mixing 0.38 parts by mass of the particles of a fluorescent body (yttrium aluminum garnet: YAG) with 1 part by mass of this composition (total amount of surface-modified zirconium oxide particles and resin: particles of a fluorescent body=100:38) was loaded into an LED lead frame in a thickness of 300 μm. After that, the composition was held at room temperature for 3 hours. Next, the composition was slowly heated and cured to form a sealing member, thereby preparing a white LED package according to Example 1.

(3) Evaluation

The brightness of the obtained white LED package was measured by applying a voltage of 3 V and an electric current of 150 mA to the LED package with a total luminous flux measurement system (manufactured by Otsuka Electronics Co., Ltd.) and measuring the intensity of light. As a result, the brightness of this white LED package was 74.4 lm. The results are shown in Table 1.

Example 2

A dispersion liquid (third dispersion liquid) according to Example 2 was obtained in completely the same manner as in Example 1 except that 90.9 parts by mass of the second dispersion liquid and 9.1 parts by mass of the above-described silicone compound were mixed instead of mixing 66.7 parts by mass of the second dispersion liquid having a solid content adjusted to 15% by mass with toluene and 33.3 parts by mass of a silicone compound containing a methyl group and a phenyl group in Example 1.

The IA/IB and methyl group/phenyl group of the dispersion liquid according to Example 2 were measured in the same manner as in Example 1. The results are shown in Table 1.

A composition A and a composition B according to Example 2 and a cured product A and a cured product B according to Example 2 were obtained in the same manner as in Example 1 except that the dispersion liquid according to Example 2 was used instead of using the dispersion liquid according to Example 1. The results of the viscosities of the compositions and the transmittances of the cured products measured in the same manner as in Example 1 are shown in Table 1.

A composition C according to Example 2 and an LED package according to Example 2 were obtained in the same manner as in Example 1 except for the fact that the dispersion liquid according to Example 2 was used instead of using the dispersion liquid according to Example 1. The results of the same evaluations as in Example 1 are shown in Table 1.

Example 3

A dispersion liquid (third dispersion liquid) of Example 3 was obtained in completely the same manner as in Example 1 except that 95.2 parts by mass of the second dispersion liquid and 4.8 parts by mass of the above-described silicone compound were mixed instead of mixing 66.7 parts by mass of the second dispersion liquid having a solid content adjusted to 15% by mass with toluene and 33.3 parts by mass of a silicone compound containing a methyl group and a phenyl group in Example 1.

The IA/IB and methyl group/phenyl group of the dispersion liquid according to Example 3 were measured in the same manner as in Example 1. The results are shown in Table 1.

A composition A and a composition B according to Example 3 and a cured product A and a cured product B according to Example 3 were obtained in the same manner as in Example 1 except that the dispersion liquid according to Example 3 was used instead of using the dispersion liquid according to Example 1. The results of the viscosities of the compositions and the transmittances of the cured products measured in the same manner as in Example 1 are shown in Table 1.

A composition C according to Example 3 and an LED package according to Example 3 were obtained in the same manner as in Example 1 except for the fact that the dispersion liquid according to Example 3 was used instead of using the dispersion liquid according to Example 1. The results of the same evaluations as in Example 1 are shown in Table 1.

Example 4

(Second Hydrolysis Step)

As a second silane compound, 91.66 parts by mass of phenyltrimethoxysilane (product name: KBM-103, manufactured by Shin-Etsu Chemical Co., Ltd.), 8.33 parts by mass of water, and 0.01 parts by mass of hydrochloric acid (1N) were added and mixed to obtain a hydrolyzed liquid. Next, this hydrolyzed liquid was stirred at 60° C. for 30 minutes, and a hydrolysis treatment of phenyltrimethoxysilane was carried out, thereby obtaining a hydrolyzed liquid.

(Preparation of Dispersion Liquid)

62.5 Parts by mass of the second dispersion liquid having a solid content adjusted to 15% by mass, which was obtained in the production process of Example 1, 6.3 parts by mass of the hydrolyzed liquid of phenyltrimethoxysilane, and 31.2 parts by mass of a silicone compound containing a methyl group and a phenyl group (trade name: KR213 (high phenyl content), manufactured by Shin-Etsu Chemical Co., Ltd.) were mixed and stirred at 100° C. for 3 hours to obtain a dispersion liquid (third dispersion liquid) according to Example 4.

The IA/IB and methyl group/phenyl group of the dispersion liquid according to Example 4 were measured in the same manner as in Example 1. The results are shown in Table 1.

A composition A and a composition B according to Example 4 and a cured product A and a cured product B according to Example 4 were obtained in the same manner as in Example 1 except that the dispersion liquid according to Example 4 was used instead of using the dispersion liquid according to Example 1. The results of the viscosities of the compositions and the transmittances of the cured products measured in the same manner as in Example 1 are shown in Table 1.

A composition C according to Example 4 and an LED package according to Example 4 were obtained in the same manner as in Example 1 except for the fact that the dispersion liquid according to Example 4 was used instead of using the dispersion liquid according to Example 1. The results of the same evaluations as in Example 1 are shown in Table 1.

Example 5

A dispersion liquid according to Example 5 was obtained in the same manner as in Example 4 except that 60.6 parts by mass of the second dispersion liquid, 9.1 parts by mass of the hydrolyzed liquid of phenyltrimethoxysilane, and 30.3 parts by mass of a silicone compound containing a methyl group and a phenyl group were mixed instead of mixing 62.5 parts by mass of the second dispersion liquid, 6.3 parts by mass of the hydrolyzed liquid of phenyltrimethoxysilane, and 31.2 parts by mass of a silicone compound containing a methyl group and a phenyl group in Example 4.

The IA/IB and methyl group/phenyl group of the dispersion liquid according to Example 5 were measured in the same manner as in Example 1. The results are shown in Table 1.

A composition A and a composition B according to Example 5 and a cured product A and a cured product B according to Example 5 were obtained in the same manner as in Example 1 except that the dispersion liquid according to Example 5 was used instead of using the dispersion liquid according to Example 1. The results of the viscosities of the compositions and the transmittances of the cured products measured in the same manner as in Example 1 are shown in Table 1.

A composition C according to Example 5 and an LED package according to Example 5 were obtained in the same manner as in Example 1 except for the fact that the dispersion liquid according to Example 5 was used instead of using the dispersion liquid according to Example 1. The results of the same evaluations as in Example 1 are shown in Table 1.

Example 6

A dispersion liquid according to Example 6 was obtained in the same manner as in Example 4 except that 64.5 parts by mass of the second dispersion liquid, 3.2 parts by mass of the hydrolyzed liquid of phenyltrimethoxysilane, and 32.3 parts by mass of a silicone compound containing a methyl group and a phenyl group were mixed instead of mixing 62.5 parts by mass of the second dispersion liquid, 6.3 parts by mass of the hydrolyzed liquid of phenyltrimethoxysilane, and 31.2 parts by mass of a silicone compound containing a methyl group and a phenyl group in Example 4.

The IA/IB and methyl group/phenyl group of the dispersion liquid according to Example 6 were measured in the same manner as in Example 1. The results are shown in Table 1.

A composition A and a composition B according to Example 6 and a cured product A and a cured product B according to Example 6 were obtained in the same manner as in Example 1 except that the dispersion liquid according to Example 6 was used instead of using the dispersion liquid according to Example 1. The results of the viscosities of the compositions and the transmittances of the cured products measured in the same manner as in Example 1 are shown in Table 1.

A composition C according to Example 6 and an LED package according to Example 6 were obtained in the same manner as in Example 1 except for the fact that the dispersion liquid according to Example 6 was used instead of using the dispersion liquid according to Example 1. The results of the same evaluations as in Example 1 are shown in Table 1.

Example 7

A dispersion liquid according to Example 7 was obtained in the same manner as in Example 4 except that 65.4 parts by mass of the second dispersion liquid, 2.0 parts by mass of the hydrolyzed liquid of phenyltrimethoxysilane, and 32.6 parts by mass of a silicone compound containing a methyl group and a phenyl group were mixed instead of mixing 62.5 parts by mass of the second dispersion liquid, 6.3 parts by mass of the hydrolyzed liquid of phenyltrimethoxysilane, and 31.2 parts by mass of a silicone compound containing a methyl group and a phenyl group in Example 4.

The IA/IB and methyl group/phenyl group of the dispersion liquid according to Example 7 were measured in the same manner as in Example 1. The results are shown in Table 1.

A composition A and a composition B according to Example 7 and a cured product A and a cured product B according to Example 7 were obtained in the same manner as in Example 1 except that the dispersion liquid according to Example 7 was used instead of using the dispersion liquid according to Example 1. The results of the viscosities of the compositions and the transmittances of the cured products measured in the same manner as in Example 1 are shown in Table 1.

A composition C according to Example 7 and an LED package according to Example 7 were obtained in the same manner as in Example 1 except for the fact that the dispersion liquid according to Example 7 was used instead of using the dispersion liquid according to Example 1. The results of the same evaluations as in Example 1 are shown in Table 1.

Example 8

A dispersion liquid according to Example 8 was obtained in the same manner as in Example 4 except that 62.9 parts by mass of the second dispersion liquid, 5.7 parts by mass of phenyltrimethoxysilane, and 31.4 parts by mass of a silicone compound containing a methyl group and a phenyl group were mixed instead of mixing 62.5 parts by mass of the second dispersion liquid, 6.3 parts by mass of the hydrolyzed liquid of phenyltrimethoxysilane, and 31.2 parts by mass of a silicone compound containing a methyl group and a phenyl group in Example 4.

The IA/IB and methyl group/phenyl group of the dispersion liquid according to Example 8 were measured in the same manner as in Example 1. The results are shown in Table 1.

A composition A and a composition B according to Example 8 and a cured product A and a cured product B according to Example 8 were obtained in the same manner as in Example 1 except that the dispersion liquid according to Example 8 was used instead of using the dispersion liquid according to Example 1. The results of the viscosities of the compositions and the transmittances of the cured products measured in the same manner as in Example 1 are shown in Table 1.

A composition C according to Example 8 and an LED package according to Example 8 were obtained in the same manner as in Example 1 except for the fact that the dispersion liquid according to Example 8 was used instead of using the dispersion liquid according to Example 1. The results of the same evaluations as in Example 1 are shown in Table 1.

Comparative Example 1

A dispersion liquid (third dispersion liquid) of Comparative Example 1 was obtained in completely the same manner as in Example 1 except that 95.5 parts by mass of the second dispersion liquid and 4.5 parts by mass of the above-described silicone compound were mixed instead of mixing 66.7 parts by mass of the second dispersion liquid having a solid content adjusted to 15% by mass with toluene and 33.3 parts by mass of a silicone compound containing a methyl group and a phenyl group in Example 1.

The IA/IB and methyl group/phenyl group of the dispersion liquid according to Comparative Example 1 were measured in the same manner as in Example 1. The results are shown in Table 1.

A composition A according to Comparative Example 1 and a cured product A according to Comparative Example 1 were obtained in the same manner as in Example 1 except that the dispersion liquid according to Comparative Example 1 was used instead of using the dispersion liquid according to Example 1. The results of the viscosities of the compositions and the transmittances of the cured products measured in the same manner as in Example 1 are shown in Table 1.

An attempt was made to obtain a composition B and a cured product B in the same manner as in Example 1 using the dispersion liquid according to Comparative Example 1. However, since it was not possible to disperse the dispersion liquid of Comparative Example 1 in a phenyl-based silicone resin component and white turbidity and agglomeration occurred in the composition B, it was not possible to prepare a cured product B.

A composition C according to Comparative Example 1 and an LED package according to Comparative Example 1 were obtained in the same manner as in Example 1 except for the fact that the dispersion liquid according to Comparative Example 1 was used instead of using the dispersion liquid according to Example 1. The results of the same evaluations as in Example 1 are shown in Table 1.

Comparative Example 2

The mixing step and the dispersion step were carried out in the same manner as in Example 1 except that, in the mixing step of Example 1, 20 parts by mass of the hydrolyzed liquid and 50 parts by mass of isopropyl alcohol (IPA) were used instead of mixing 70 parts by mass of the hydrolyzed liquid of methyltrimethoxysilane, thereby obtaining a dispersion liquid (first dispersion liquid).

As a result of measuring the solid content of the dispersion liquid (at 100° C. for 1 hour), the solid content was 38% by mass.

(4) First Addition Step

Toluene was added to the obtained dispersion liquid (first dispersion liquid) such that the solid content became 20% by mass, and the dispersion liquid was heated at for 2 hours. Next, about the same amount of toluene as the volatilized amount was added to the dispersion liquid, and the dispersion liquid was heated at 60° C. for 2 hours. Next, about the same amount of toluene as the volatilized amount was added to the dispersion liquid, and the dispersion liquid was heated at 60° C. for 1 hour. Next, about the same amount of toluene as the volatilized amount was added to the dispersion liquid, and the dispersion liquid was heated at 60° C. for 1 hour, whereby surface modification was accelerated, and a dispersion liquid in which isopropyl alcohol was replaced with toluene (second dispersion liquid) was obtained.

(5) Second Addition Step 89 parts by mass of the second dispersion liquid having a solid content adjusted to 15% by mass and 11 parts by mass of a silicone compound containing a methyl group and a phenyl group (trade name: KR213 (high phenyl content), manufactured by Shin-Etsu Chemical Co., Ltd.) were mixed and heated at 110° C. for 1 hour, thereby obtaining a dispersion liquid (third dispersion liquid) according to Comparative Example 2.

The IA/IB and methyl group/phenyl group of the dispersion liquid according to Comparative Example 2 were measured in the same manner as in Example 1. The results are shown in Table 1.

A composition B and a cured product B according to Comparative Example 1 were obtained in the same manner as in Example 1 except that the dispersion liquid according to Comparative Example 2 was used instead of using the dispersion liquid according to Example 1. The results of the viscosities and transmittances measured in the same manner as in Example 1 are shown in Table 1.

An attempt was made to obtain a composition A and a cured product A in the same manner as in Example 1 using the dispersion liquid according to Comparative Example 2. However, since it was not possible to disperse the dispersion liquid of Comparative Example 2 in a methyl-based silicone resin component and white turbidity and agglomeration occurred in the composition A, it was not possible to prepare a cured product A.

Comparative Example 3

The mixing step, the dispersion step, and the first addition step were carried out in the same manner as in Example 1 except that, in the mixing step of Example 1, 70 parts by mass of the hydrolyzed liquid of phenyltrimethoxysilane obtained in the hydrolysis step of Example 4 was used instead of using 70 parts by mass of the hydrolyzed liquid of methyltrimethoxysilane, thereby obtaining a dispersion liquid (second dispersion liquid).

89 parts by mass of the second dispersion liquid having a solid content adjusted to 15% by mass and 11 parts by mass of a silicone compound containing a methyl group and a phenyl group (trade name: KR213 (high phenyl content), manufactured by Shin-Etsu Chemical Co., Ltd.) were mixed and heated at 110° C. for 1 hour, thereby obtaining a dispersion liquid (third dispersion liquid) according to Comparative Example 3.

The IA/IB and methyl group/phenyl group of the dispersion liquid according to Comparative Example 3 were measured in the same manner as in Example 1. The results are shown in Table 1.

A composition B and a cured product B according to Comparative Example 1 were obtained in the same manner as in Example 1 except that the dispersion liquid according to Comparative Example 3 was used instead of using the dispersion liquid according to Example 1. The results of the viscosities and transmittances measured in the same manner as in Example 1 are shown in Table 1.

An attempt was made to obtain a composition A and a cured product A in the same manner as in Example 1 using the dispersion liquid according to Comparative Example 3. However, since it was not possible to disperse the dispersion liquid of Comparative Example 3 in a methyl-based silicone resin component and white turbidity and agglomeration occurred in the composition A, it was not possible to prepare a cured product A.

Comparative Example 4

The mixing step, the dispersion step, and the first addition step were carried out in the same manner as in Example 1 except that, in the mixing step of Example 1, 70 parts by mass of the above-described hydrolyzed liquid of phenyltrimethoxysilane was used instead of using 70 parts by mass of the hydrolyzed liquid of methyltrimethoxysilane, thereby obtaining a dispersion liquid (second dispersion liquid).

91 parts by mass of the second dispersion liquid having a solid content adjusted to 15% by mass and 9 parts by mass of the above-described hydrolyzed liquid of methyltrimethoxysilane were mixed and stirred at 130° C. for 3 hours, thereby obtaining a dispersion liquid of Comparative Example 4 (third dispersion liquid).

The IA/IB and methyl group/phenyl group according to Comparative Example 4 were measured in the same manner as in Example 1. The results are shown in Table 1.

An attempt was made to obtain a composition and a cured product according to Comparative Example 4 in the same manner as in Example 1 except that the dispersion liquid according to Comparative Example 4 was used instead of using the dispersion liquid according to Example 1. However, it was not possible to disperse the dispersion liquid of Comparative Example 4 in any of a methyl-based silicone resin or a phenyl-based silicone resin, and white turbidity and agglomeration occurred in both the compositions A and B. Therefore, it was not possible to prepare the cured product A and the cured product B.

TABLE 1

| | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|
| IA/IB | 1.9 | 2.1 | 1.8 | 1.0 | 1.2 | 1.1 | 1.3 | 1.2 | 2.0 | 4.2 | 3.8 | 3.7 |
| Methyl group/phenyl group | 0.45 | 4 | 9 | 0.63 | 0.40 | 4 | 9 | 0.45 | 11 | 0.30 | 0.01 | 0.50 |
| Viscosity A [Pa · s] | 8 | 13 | 20 | 21 | 23 | 10.0 | 3.0 | 1.5 | 6.5 | — | — | — |
| Transmittance A [%] | 70 | 72 | 75 | 72 | 70 | 78 | 80 | 71 | 85 | White turbidity and agglomeration | White turbidity and agglomeration | White turbidity and agglomeration |
| Viscosity B [Pa · s] | 10 | 15 | 19 | 12 | 7 | 22 | 25 | 3 | — | 25 | 40 | — |
| Transmittance B [%] | 77 | 71 | 69 | 80 | 82 | 72 | 77 | 80 | White turbidity and agglomeration | 30 | 80 | White turbidity and agglomeration |
| Total luminous flux of LED [1 m] | 74.4 | 74.5 | 74.6 | 75.0 | 75.3 | 74.8 | 74.9 | 75.5 | 74.2 | — | — | — |

From the comparison between Example 1 to Example 8 and Comparative Example 1 to Comparative Example 4, it was confirmed that the zirconium oxide particles which had been sufficiently surface-modified by a silane compound containing a methyl group and a silicone compound containing a phenyl group, in which the ratio of methyl group/phenyl group was 0.01 or more and 10 or less, such that IA/IB≤3.5 was satisfied were favorably dispersed both in methyl-based silicone phenyl resins containing many methyl groups and phenyl-based silicone resins containing many phenyl groups.

In addition, from the comparison between Example 1 to Example 3 and Example 4 to Example 8, it was confirmed that the zirconia particles which had been surface-modified by the silane compound containing a methyl group and a phenyl group and the silicone compound containing a methyl group and a phenyl group further improve the brightness of the LED packages.

Hitherto, the preferable embodiment of the present invention has been described in detail with reference to the accompanying drawings, but the present invention is not limited to such examples. It is evident that a person skilled in the art of the present invention is able to conceive a variety of modification examples or correction examples within the scope of the technical concept described in the claims, and it is needless to say that such examples are understood to be in the technical scope of the present invention.

INDUSTRIAL APPLICABILITY

The present invention is capable of providing a dispersion liquid containing surface-modified metal oxide particles that can be dispersed both in methyl-based silicone resins and in phenyl-based silicone resins, a composition containing the dispersion liquid, a sealing member formed using the composition, a light-emitting device having the sealing member, an illumination tool and a display device each including the light-emitting device.

The invention claimed is:

1. A dispersion liquid comprising:
    metal oxide particles which have been surface-modified by at least one kind of silane compound and at least one kind of silicone compound; and
    a solvent,
    wherein the silane compound contains a methyl group,
    the silicone compound contains a hydrocarbon group having 2 or more carbon atoms,
    a mole ratio (methyl group/hydrocarbon group) of the methyl group to the hydrocarbon group in the metal oxide particles is 0.01 or more and 10 or less,
    wherein the metal oxide particles which have been surface-modified by the at least one kind of silane compound and the at least one kind of silicone compound are secondarily modified metal oxide particles obtained by
    primarily modifying metal oxide particles by a first surface-modifying material composed of a silane compound containing a methyl group and not containing a hydrocarbon group having 2 or more carbon atoms, and
    secondarily modifying the primarily-modified metal oxide particles by
    a second surface-modifying material composed of at least one of a silicone compound containing a methyl group and a hydrocarbon group having 2 or more carbon atoms and a silicone compound not containing a methyl group and containing a hydrocarbon group having 2 or more carbon atoms,
    in a case where a transmission spectrum of the metal oxide particles that are obtained by drying the dispersion liquid by vacuum drying is measured in a wavenumber range of 800 cm$^{-1}$ or higher and 3,800 cm$^{-1}$ or lower with a Fourier transform infrared spectrophotometer, and values of the transmission spectrum are standardized such that a maximum value of the transmission spectrum in the range is 100 and a minimum value is 0, the following expression (1) is satisfied, $$IA/IB \leq 3.5 \tag{1}$$

(in the expression, "IA" represents a spectrum value standardized at 3,500 cm$^{-1}$, and "IB" represents a spectrum value standardized at 1,100 cm$^{-1}$).

2. The dispersion liquid according to claim 1, wherein the hydrocarbon group having 2 or more carbon atoms is an aromatic hydrocarbon group.

3. A composition, which is a mixture of the dispersion liquid according to claim 1 and a silicone resin component.

4. A sealing member, which is a cured product of the composition according to claim 3.

5. A light-emitting device, comprising:
    the sealing member according to claim 4; and
    a light-emitting element sealed with the sealing member.

6. An illumination tool, comprising:
    the light-emitting device according to claim 5.

7. A display device, comprising:
    the light-emitting device according to claim 5.

8. A method for producing the dispersion liquid according to claim 1, comprising:
    a step of mixing the first surface-modifying material and metal oxide particles to obtain a liquid mixture;
    a step of dispersing the metal oxide particles in the liquid mixture; and
    a step of adding the second surface-modifying material to the liquid mixture to obtain the dispersion liquid,
    wherein a content of the metal oxide particles in the liquid mixture is 10% by mass or more and 49% by mass or less,
    a total content of the first surface-modifying material and the metal oxide particles in the liquid mixture is 65% by mass or more and 98% by mass or less.

9. The method for producing a dispersion liquid according to claim 8, further comprising:
    a step of hydrolyzing the first surface-modifying material before being mixed with the metal oxide particles; and
    a step of hydrolyzing the second surface-modifying material before being added to the liquid mixture,
    wherein the dispersion step is carried out using a disperser.

10. The method for producing a dispersion liquid according to claim 9, further comprising one or both of, between the dispersion step and the step of obtaining the dispersion liquid:
    a step of adding a hydrophobic solvent to the dispersed liquid mixture; and
    a step of removing an alcohol generated in the hydrolyzing step.

11. The dispersion liquid according to claim 1, wherein the metal oxide particles are zirconium oxide particles or titanium oxide particles.

* * * * *